United States Patent [19]
Sawada

[11] Patent Number: 4,641,073
[45] Date of Patent: Feb. 3, 1987

[54] STEPPER MOTOR CONTROL SYSTEM

[75] Inventor: Kenji Sawada, Kawasaki, Japan

[73] Assignee: Fujitsu Limited, Kawasaki, Japan

[21] Appl. No.: 564,714

[22] Filed: Dec. 3, 1983

[30] Foreign Application Priority Data

Dec. 24, 1982 [JP] Japan ................. 57-234701

[51] Int. Cl.$^4$ ................................. H02P 8/00
[52] U.S. Cl. ..................... 318/696; 318/68.5
[58] Field of Search ............... 318/68.5, 696, 560, 318/567

[56] References Cited

U.S. PATENT DOCUMENTS

| 4,156,170 | 5/1979 | Strumc | 318/696 |
| 4,280,084 | 7/1981 | Chiang | 318/696 |

FOREIGN PATENT DOCUMENTS

| 0064391 | 11/1982 | European Pat. Off. . |
| 1250662 | 9/1967 | Fed. Rep. of Germany . |
| 2625397 | 12/1977 | Fed. Rep. of Germany . |
| 2909842 | 6/1980 | Fed. Rep. of Germany . |
| 47-21216 | 10/1972 | Japan . |
| 49-43532 | 4/1974 | Japan . |
| 1309050 | 7/1971 | United Kingdom . |

OTHER PUBLICATIONS

IBM Technical Disclosure Bulletin, "Adaptive Step Motor Control Circuit", pp. 3681–3682, vol. 22, No. 8B, Jan. 1980.
IBM Technical Disclosure Bulletin, "Table Splitting for Stepper Motor Control", p. 3052, vol. 22, No. 8A, Jan. 1980.
European Search Report, Berlin, Nov. 20, 1984, examiner: Gessner.
IBM Tech. Dis. Bul., vol. 12, #7, 1969, p. 1032.
IBM Tech. Bul., vol. 4, #6, pp. 10–11, 1961.
IBM Tech. Bul., vol. 5, #11, pp. 27–29.
IBM Journal, Jan. 1968, pp. 34–40.
IBM Tech. Dis. Bul., vol. 13, #5, p. 1149, 1970.
IBM Tech. Dis. Bul., vol. 1, #4, p. 44, 1958.

Primary Examiner—William M. Shoop, Jr.
Assistant Examiner—Saul M. Bergmann
Attorney, Agent, or Firm—Staas & Halsey

[57] ABSTRACT

A stepper motor control system for rotating a stepper motor by a desired amount of movement, including a first ROM (ROM$_3$) for storing acceleration control data, a second ROM (ROM$_4$) for storing deceleration control data and a change point control circuit for controlling a change point period between acceleration and deceleration. The change point control circuit assures that the acceleration is smoothly joined to the deceleration through the change point period so that the rotor of the stepper motor stops instantly and accurately at the target position.

29 Claims, 28 Drawing Figures

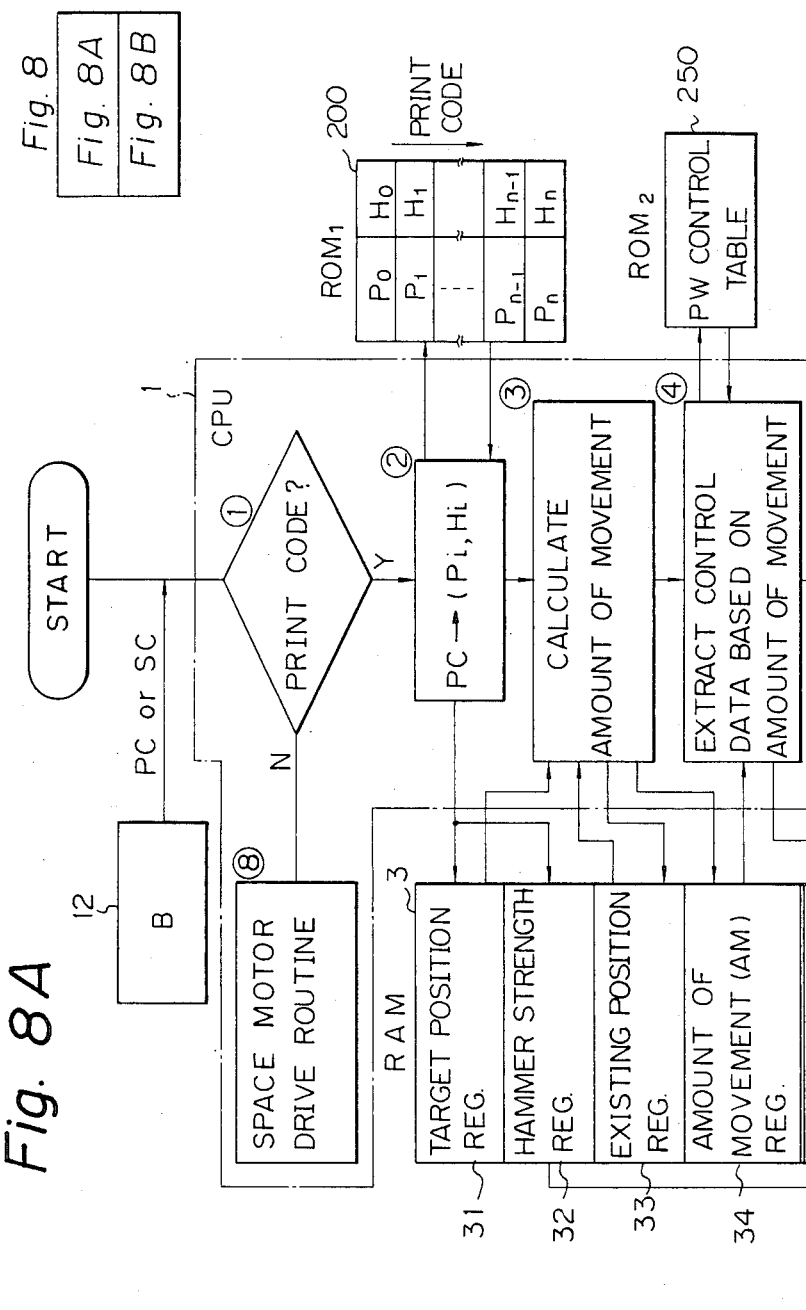

Fig. 9

ROM₂
PW CONTROL TABLE

| TOTAL STEPS | DATA | CHANGE POINT CONTROL DATA |
|---|---|---|
| $i$ (i=1,2,...,or 96) | ACC STEPS | |
| | DEC STEPS | |
| | FIRST TIME DATA $t_{c1}$ | |
| | FIRST PHASE CONTROL DATA (PHASE DATA $P_{c1}$ & CURRENT CONTROL DATA $C_{c1}$) | |
| | ABSOLUTE PHASE CONTROL DATA (PHASE DATA $P_{ab}$ & CURRENT CONTROL DATA $C_{ab}$) | |
| | SECOND TIME DATA $t_{c2}$ | |
| | SECOND PHASE CONTROL DATA (PHASE DATA $P_{c2}$ & CURRENT CONTROL DATA $C_{c2}$) | |

Fig. 10

ROM₃
ACC TABLE

| ADDRESS | DATA |
|---|---|
| $A_j$ <br> ($j = 1, 2, \ldots$) | TIME DATA $t_j$ (2 BYTES) |
| | PHASE DATA $P_j$ (2 BITS) |
| | CURRENT CONTROL DATA $C_j$ (3 BITS) |

Fig. 11

ROM₄
DEC TABLE

| ADDRESS | DATA |
|---|---|
| $A_k$ <br> ($k = \ldots 3, 2, 1$) | TIME DATA $t'_k$ (2 BYTES) |
| | PHASE DATA $P'_k$ (2 BITS) |
| | CURRENT CONTROL DATA $C'_k$ (3 BITS) |

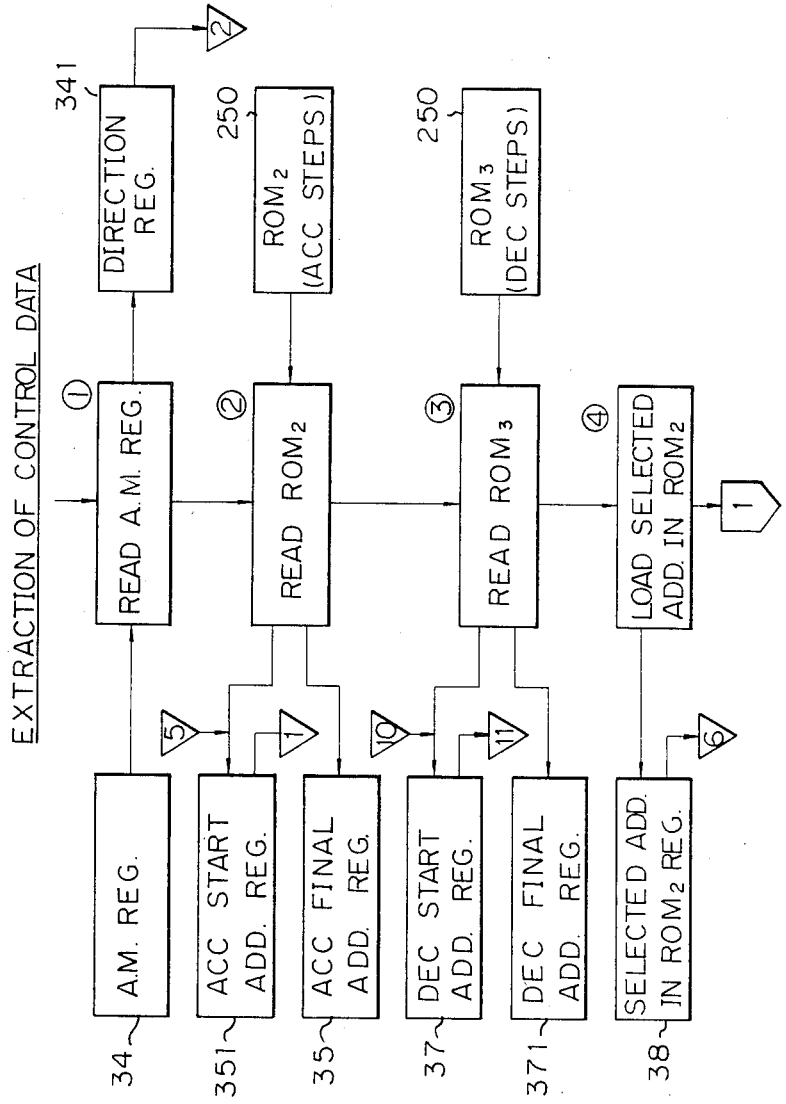

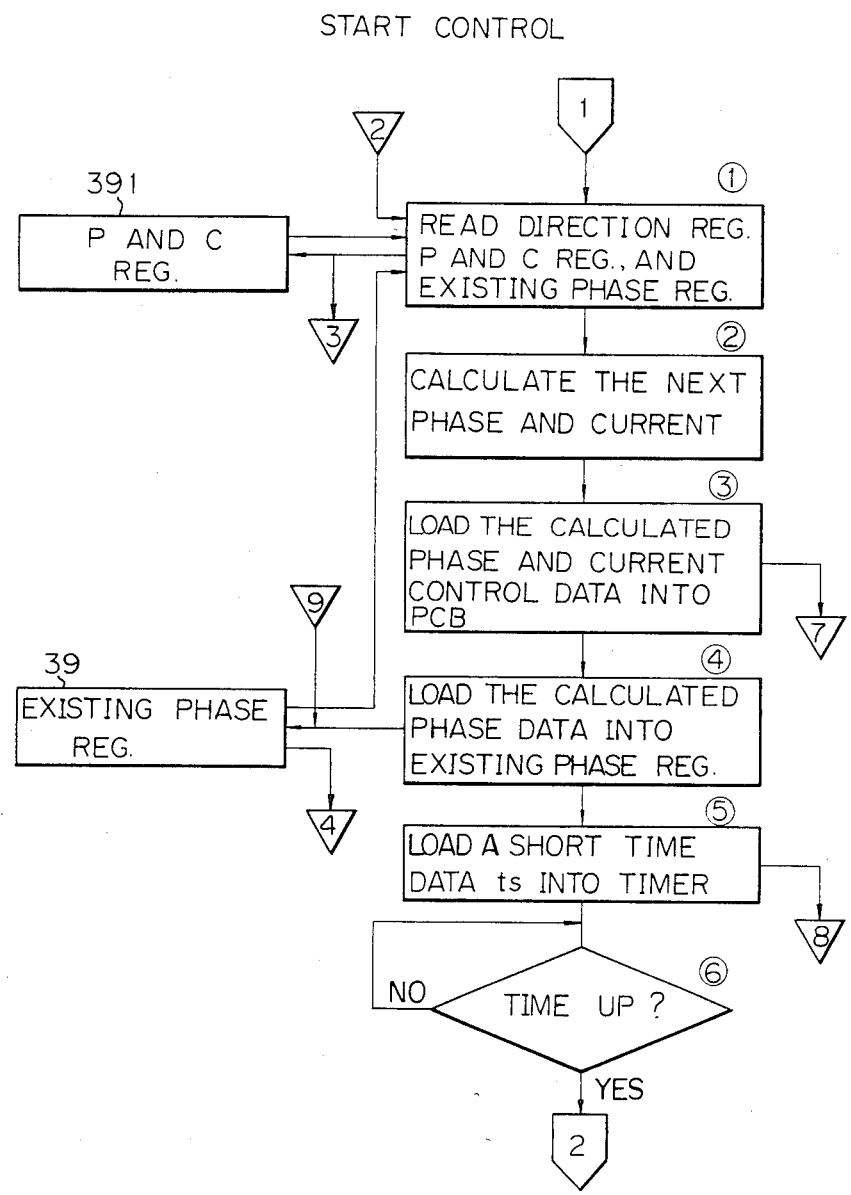

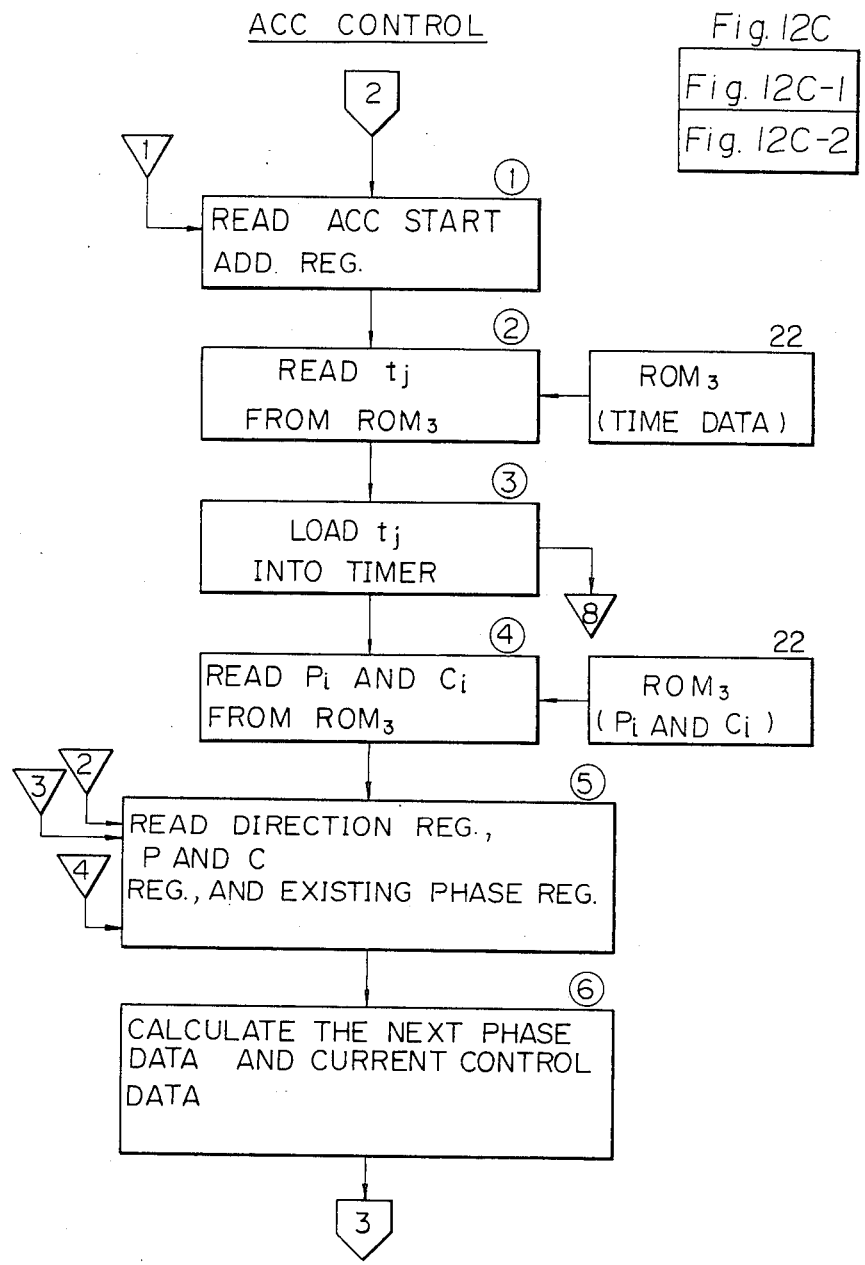

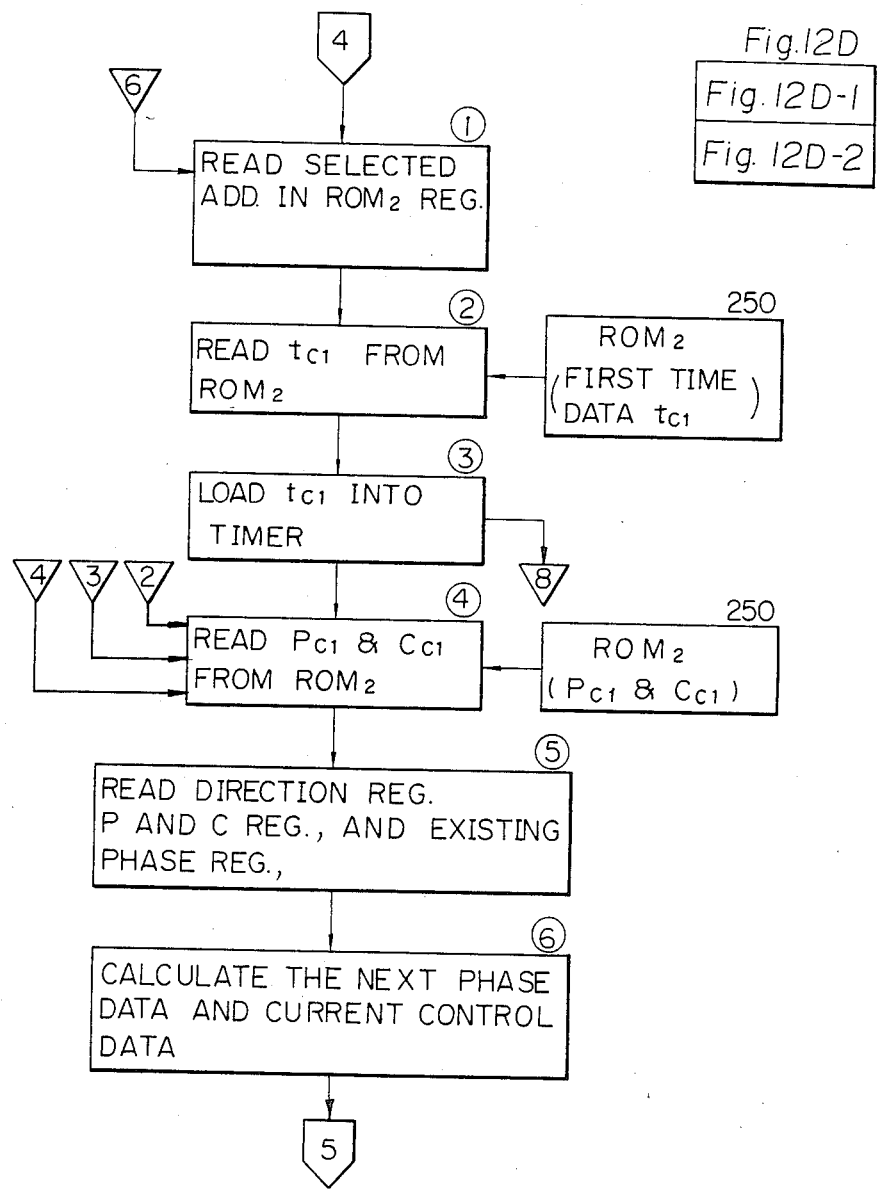

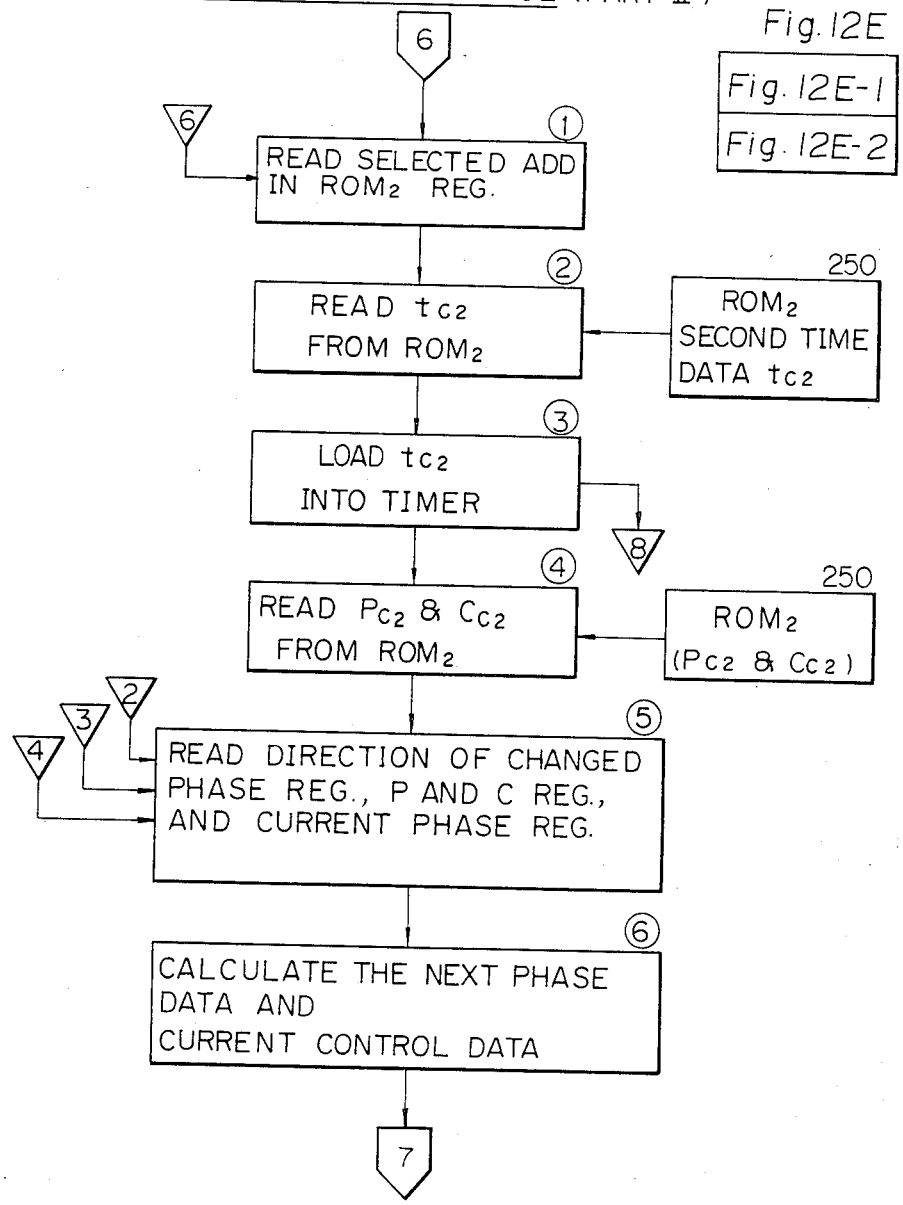

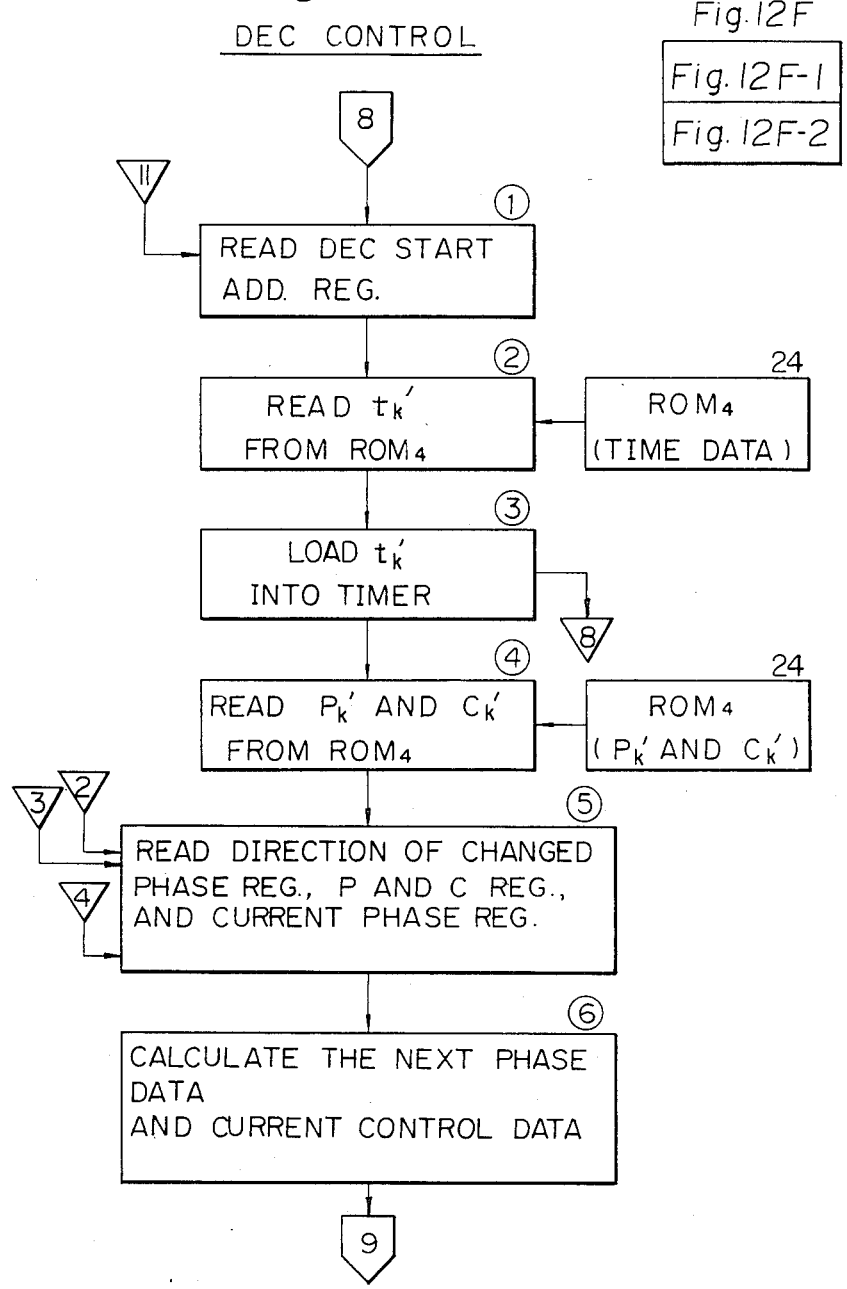

| Fig.13A | Fig.13B |

STEPPER MOTOR CONTROL SYSTEM

BACKGROUND OF THE INVENTION

1. Field of the Invention

The present invention relates to a stepper motor control system. More particularly, it relates to a stepper motor control system adapted to drive a serial printer having a character printing wheel, space mechanism, and hammer mechanism, in which the stepper motor is rotated precisely by a desired amount of movement by controlling a change point between acceleration and deceleration when the amount of movement is smaller than a predetermined value.

2. Description of the Prior Art

The prior art publications in the field of the present invention are listed below.

a. Japanese Examined Patent Publication No. 32-8364;

b. Japanese Examined Patent Publication No. 39-27798 (filed Aug. 6, 1963, published Dec. 3, 1964);

c. British Patent No. 1112335 (filed Aug. 6, 1965, issued May 1, 1968);

d. FUJITSU, August 1968 "F462K/KI disc pack";

e. Japanese Unexamined Patent Publication No. 51-78638 (filed Dec. 23, 1974, open to public July 8, 1976);

f. Computer, September 1975 "IBM Line Printer"; and g. Sogo Denshi Shuppansha, Feb. 10, 1979

In a conventional stepper motor control system, an acceleration table, a constant-velocity table, and a deceleration table are provided. To energize each phase of the stepper motor step by step, one of the above-mentioned tables is indexed to determine the phase to be energized, the electrical current to be supplied to the phase, and the period of time for the phase to be energized, as will be described later in detail with reference to FIG. 4. Using this conventional control, the stepper motor can be precisely controlled to be rotated by a desired amount of angular displacement and the rotor stops instantly at the desired target position only when the desired amount of angular displacement is greater than a predetermined value, so that the stepper motor is controlled by the acceleration table during acceleration, by the constant-velocity table during the constant-velocity period, and by the deceleration table during deceleration. This mode of control is referred to as a normal control mode. If, however, the desired amount of angular displacement is smaller than the above-mentioned predetermined value, the constant-velocity table is not used. That is, the stepper motor is controlled at first by a part of the acceleration table and then directly branched, without indexing to the constant velocity table, to an intermediate point of the deceleration table. This mode of control is referred to as a jump control mode. In this jump control mode the rotor of the stepper motor cannot stop instantly at the desired target position, because the acceleration table and the deceleration table are formed to meet the above-mentioned normal control mode, and the jump control mode is not taken into account. That is, in the jump control mode, a part of the acceleration table for the normal control mode is forced to be joined to a part of the deceleration table. The problem that the conventional jump control mode has stopping the load instantly will be described later in detail with reference to the drawings.

In order to stop the rotor of the stepper motor instantly when the desired amount of angular displacement is smaller than the predetermined value, an additional acceleration table providing a relatively small acceleration and an additional deceleration table providing a relatively small deceleration, are conventionally provided for controlling small amounts of movement (see Japanese Unexamined Patent Publication No. 51-78638). This countermeasure, however, causes an increase in the amount of hardware and requires complex control due to the additional acceleration and deceleration tables.

SUMMARY OF THE INVENTION

An object of the present invention is to provide a stepper motor control system which can stop the rotation of a stepper motor precisely in a jump control mode, without the need for additional acceleration and deceleration tables.

Another object of the present invention is to provide a stepper motor control system having a change point control table for controlling a change point between acceleration and deceleration in a jump control mode, to instantly stop the rotation of a stepper motor after moving the desired amount of angular displacement in the jump control mode.

To attain the above objects, there is provided a stepper motor control system for a stepper motor having a rotatable member which is to be rotated by a desired amount of angular displacement. The control system includes a control device electrically connected to the stepper motor for driving the stepper motor. When the desired amount of angular displacement is larger than a predetermined amount, the control device accelerates the rotation of the stepper motor by supplying an acceleration pulse sequence to the stepper motor until the rotation speed equals a predetermined rotation speed, drives the stepper motor at substantially the predetermined rotation speed and decelerates the rotation of the stepper motor from the predetermined rotation speed by supplying a deceleration pulse sequence to the stepper motor to stop the rotation after rotating by precisely the desired amount of angular displacement. When the desired amount of angular displacement is smaller that the predetermined amount, the control device accelerates the rotation by supplying the acceleration pulse sequence to the stepper motor until the rotation speed is a rotation speed determined by the desired amount of angular displacement, regulates the rotation of the stepper motor after the end of the acceleration so that the stepper motor is able to follow deceleration control, and decelerates the rotation of the stepper motor by supplying the deceleration pulse sequence to the stepper motor after the regulating step.

According to one embodiment of the present invention, the stepper motor control system includes a first storage device for storing a plurality of first sets of control data, each of the first sets including at least a first number of acceleration steps of the stepper motor, a second number of constant-velocity steps of the stepper motor for use when the desired amount of angular displacement is greater than a first predetermined value, and a third number of deceleration steps of the stepper motor. The first number, the second number, and the third number correspond to the desired amount of angular displacement. A second storage device stores a plurality of second sets of control data, each of the second sets including at least a first time data indicating an acceleration period for one of the acceleration steps. A third storage device stores a plurality of third sets of control data, each of the third sets including at least a second time data indicating a constant-velocity period for one of the constant-velocity steps. A fourth storage device stores a plurality of fourth sets of control data, each of the fourth sets including at least a third time data indicating a deceleration period for one of the deceleration steps. Also included is a control device which controls the stepper motor in accordance with one of the first sets of the control data which corresponds to the desired amount of angular displacement and in accordance with the second sets of control data, the third sets of control data, when the desired amount of angular displacement is greater than the first predetermined value, and the fourth sets of control data.

Each of the first sets of control data further includes an item of change point control data for controlling the stepper motor during a change point period between the end of the acceleration steps and the beginning of the deceleration steps when the desired amount of angular displacement is smaller than the first predetermined value. When the desired amount of angular displacement is greater than the first predetermined value, the stepper motor is first accelerated by the first number of acceleration steps, then rotated at a constant velocity by the second number of constant-velocity steps, and finally decelerated by the third number of deceleration steps. When the desired amount of angular displacement is smaller than the first predetermined value, the stepper motor is first accelerated by the first number of acceleration steps, then controlled by the change point control data, and finally decelerated by the third number of deceleration steps.

BRIEF DESCRIPTION OF THE DRAWINGS

The above objects and features as well as other advantages of the present invention will be more apparent from the following description of the embodiments with reference to the accompanying drawings, wherein:

FIG. 9 is a table of the contents in the $ROM_2$ 250 in FIG. 8;

FIG. 10 is a table of the contents in the $ROM_3$ 22 in FIG. 8;

FIG. 11 is a table of the contents in the $ROM_4$ 24 in FIG. 8;

FIG. 12A is a detailed flow chart for the extraction of control data in the process illustrated in FIG. 8;

FIG. 12B is a detailed flow chart of the start control in the process illustrated in FIG. 8;

DESCRIPTION OF THE PREFERRED EMBODIMENTS

Figure 1:
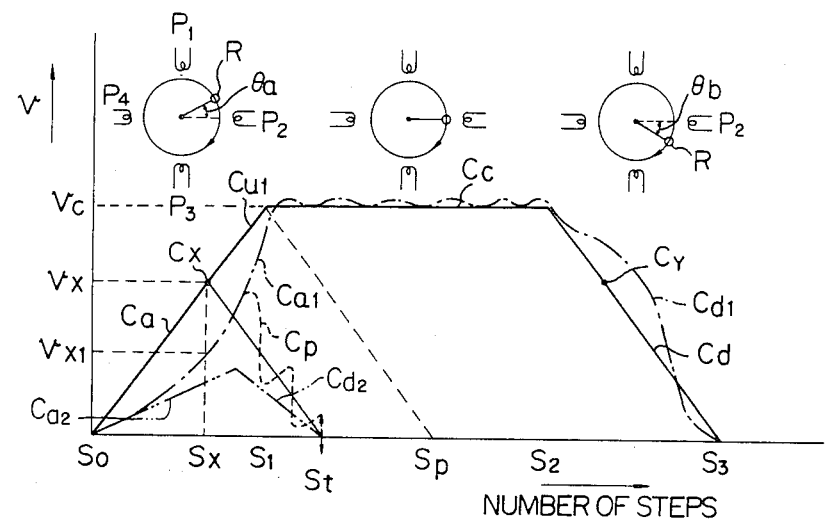
FIG. 1 is a graph of the relationship between the number of steps and the velocity of a stepper motor in a conventional stepper motor control system, illustrating the problems therein.

Before describing the embodiments of the present invention, conventional problems will first be described with reference to FIGS. 1 and 2. FIG. 1 is a graph of the relationship between the number of steps and the velocity of a stepper motor in a conventional stepper motor control system. In FIG. 1, a trapezoidal shaped solid curve $C_{u1}$ expresses a theoretical locus of a normal control mode of operation when the desired number of steps is greater than a predetermined value $S_p$. The curve $C_{u1}$ consists of an acceleration curve $C_a$ between the steps $S_0$ and $S_1$, a constant-velocity curve $C_c$ at the maximum velocity of the stepper motor between step numbers $S_1$ and $S_2$, and a deceleration curve $C_d$ between the step numbers $S_2$ and $S_3$. The gradients of the acceleration curve $C_a$ and the deceleration curve $C_d$ are constant, regardless of the number of steps, and are determined theoretically or experimentally when the number of steps is greater than the predetermined number $S_p$. When the desired number of steps is greater than the predetermined value $S_p$, the normal control mode operation is carried out by using the full length of the acceleration curve $C_a$, the necessary steps of the constant-velocity curve $C_c$, and the full length of the deceleration curve $C_d$. When the desired number of steps $S_t$ is smaller than the predetermined value $S_p$, the constant-velocity curve $C_c$ is not used, and an intermediate point $C_X$ on the acceleration curve $C_a$ is directly joined to an intermediate point $C_Y$ of the deceleration curve $C_d$. Thus the stepper motor starts from a start point expressed by a step number $S_0$ to reach the target position expressed by the step number $S_t$, using the jump control mode.

The problems existing in the conventional jump control mode will now be described in detail. In FIG. 1, a rotor R and four coils $P_1$ through $P_4$ for rotating the rotor R are illustrated. The four coils correspond to four phases of energizing current, respectively. That is, in a simple example, the rotor R is rotated by sequentially energizing the coils $P_1$ through $P_4$. During acceleration, the rotor R is accelerated so that after it has rotated through step number $S_1$, it has a constant velocity $v_c$. Therefore, at an intermediate point of the acceleration between the step numbers $S_0$ and $S_1$, the rotor R is slightly delayed from the position corresponding to the energized coil, for example, $P_2$ by a variable angle $\theta_a$, as illustrated in FIG. 1. This means that a practical locus of the acceleration is different from the theoretical locus curve $C_{u1}$. The practical locus during acceleration is indicated by a dash-dot curve $C_{a1}$. As can be seen from the practical acceleration portion of curve $C_{a1}$ and the theoretical curve $C_a$, at an intermediate point between the step numbers $S_0$ and $S_1$, the actual velocity of the rotor R is less than the theoretical velocity of the rotor R, for any given step number.

The above-described difference between the theoretical curve and the practical curve also applies to the deceleration period between step numbers $S_2$ and $S_3$. That is, during deceleration, the rotor R is decelerated so that after it has rotated through the step number $S_3$ which is greater than the predetermined value $S_p$, the rotor R stops instantly. Therefore, at an intermediate point between the step numbers $S_2$ and $S_3$, except near the target stop position corresponding to the step number $S_3$, the rotor R is slightly forward of the position corresponding to the energized coil, for example, $P_2$ by a variable angle $\theta_b$, as illustrated in FIG. 1. In the vicinity of the step number $S_3$, the rotor R is again delayed to stop precisely at the target position. The practical locus of deceleration is expressed by a dash-dot curve $C_{d1}$. During the constant-velocity period between the step numbers $S_1$ and $S_2$, the practical curve is substantially the same as the theoretical curve.

When the number of steps required to rotate the rotor to a target position is smaller than the predetermined value $S_p$, the stepper motor is controlled by the jump control mode. Assuming that the final step number will be $S_t$, then the acceleration control must be directly joined to the deceleration control at a step number $S_x$. At the step number $S_x$, the practical velocity $V_{x1}$ is smaller than the theoretical velocity $V_x$ because of the above-described factors. Therefore, at a change point between acceleration and deceleration, the rotor is at first accelerated by a remaining acceleration force and then suddenly decelerated. This sudden deceleration provides a damping force to the rotor R. As a result, during the deceleration period between the step numbers $S_x$ and $S_1$, the practical curve repeats acceleration and deceleration, as illustrated in FIG. 1 by a broken curve $C_p$, and, at the target step number $S_t$, the rotor R does not stop instantly but gradually stops with an oscillation between acceleration and deceleration.

Figure 2:
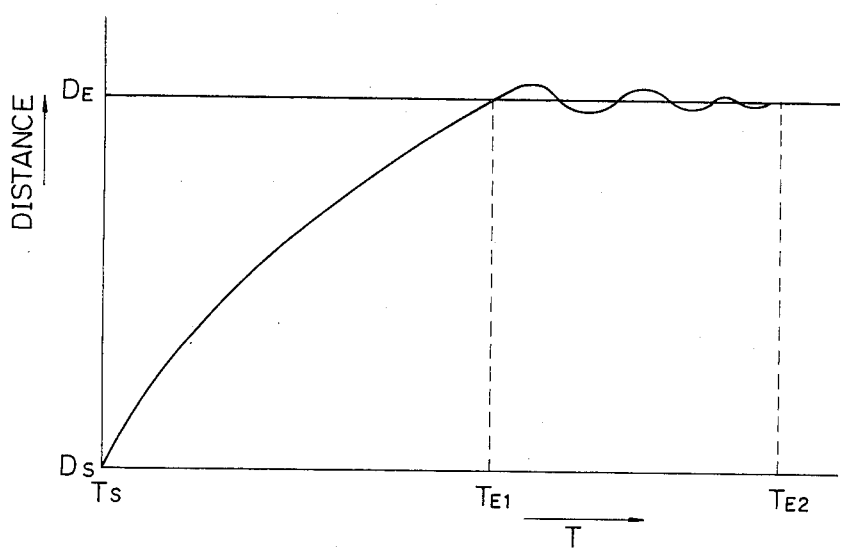
FIG. 2 is a graph of the relationship between time and distance for a stepper motor in a conventional stepper motor control system illustrating the problems therein.

This gradual stop motion will be more apparent with reference to FIG. 2, in which the ordinate represents the distance of a load moved by the stepper motor, and the abscissa represents time. At a time $T_S$, the load is positioned at a start point $D_S$. At a time $T_{E1}$, the load reaches a target position $D_E$. However, the load does not stop at the time $T_{E1}$ and continues until it stops at a time $T_{E2}$ after several oscillations.

In order to stop the rotor instantly at the step number $S_t$, another acceleration curve $C_{a2}$ having a smaller gradient with respect to the acceleration curve $C_a$, and another deceleration curve $C_{d2}$ having a smaller gradient with respect to the deceleration curve $C_d$, are conventionally employed (Japanese Unexamined Patent Publication No. 51-78638). These additional curves, however, require an increase in the amount of hardware and complex control. An object of the present invention is to remove the above-mentioned problems in stopping of the rotor of a stepper motor without using multiple acceleration and deceleration curves.

Figure 3A:
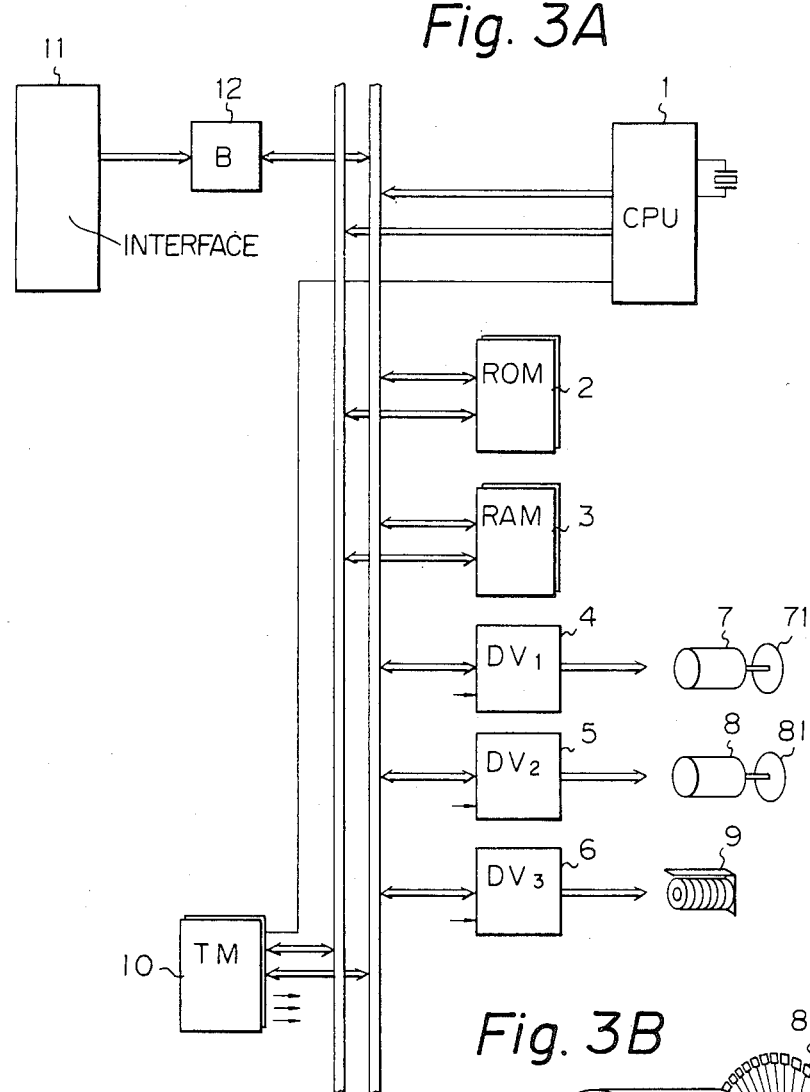
FIG. 3A is a block diagram of the general structure of a stepper motor control system according to the present invention.

FIG. 3A illustrates the general structure of a stepper motor control system, adapted to drive a serial printer, according to the present invention. In FIG. 3A, reference numeral 1 is a central processing unit (CPU), 2 a read only memory (ROM) for storing an acceleration table, a deceleration table, a control table, and a change point control table which is provided according to the present invention. Reference numeral 3 is a random access memory (RAM) for storing part of the data read from the ROM 2. Reference numerals 4–6 are driver circuits ($DV_1$, $DV_2$, and $DV_3$), 7 is a stepper motor for driving a space mechanism 71, 8 is stepper motor for driving a print wheel 81 and 9 is hammer driver. Reference numeral 10 is a timer (TM) for determining a period for each step of rotation of the stepper motors 7 and 8 or each step of the control of the hammer driver 9, 11 is an interface circuit, and 12 is an input buffer circuit (B).

Figure 3B:
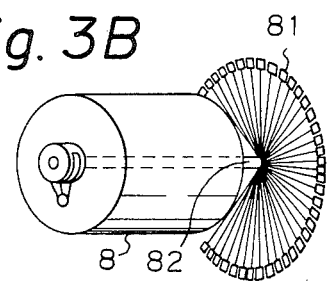
FIG. 3B is a perspective view of the stepper motor in the system illustrated in FIG. 3A.

FIG. 3B is a perspective view of the stepper motor 8 and the print wheel 81 in the system in FIG. 3A. As illustrated in FIG. 3B, the print wheel 81 is coupled to a rotating axle 82 of the stepper motor 8. The rotating axle 82 is coupled to a rotor (not shown in FIG. 3B) in the stepper motor 8. The print wheel 81 has a number of characters mounted on its circular periphery. Usually, the number of characters is 96 or 192. Therefore, to move the designated character to the position where the hammer is placed, a maximum of 192 steps of rotation are necessary. In practice, however, by rotating the rotor in the clockwise direction or counterclockwise direction, only a maximum of 96 steps are required. The stepper motor 7 and the space mechanism 71 have a structure similar to the stepper motor 8 and the print wheel 81, except that the stepper motor 7 is driven with a far greater number of steps for one rotation than the stepper motor 8.

Figure 4:
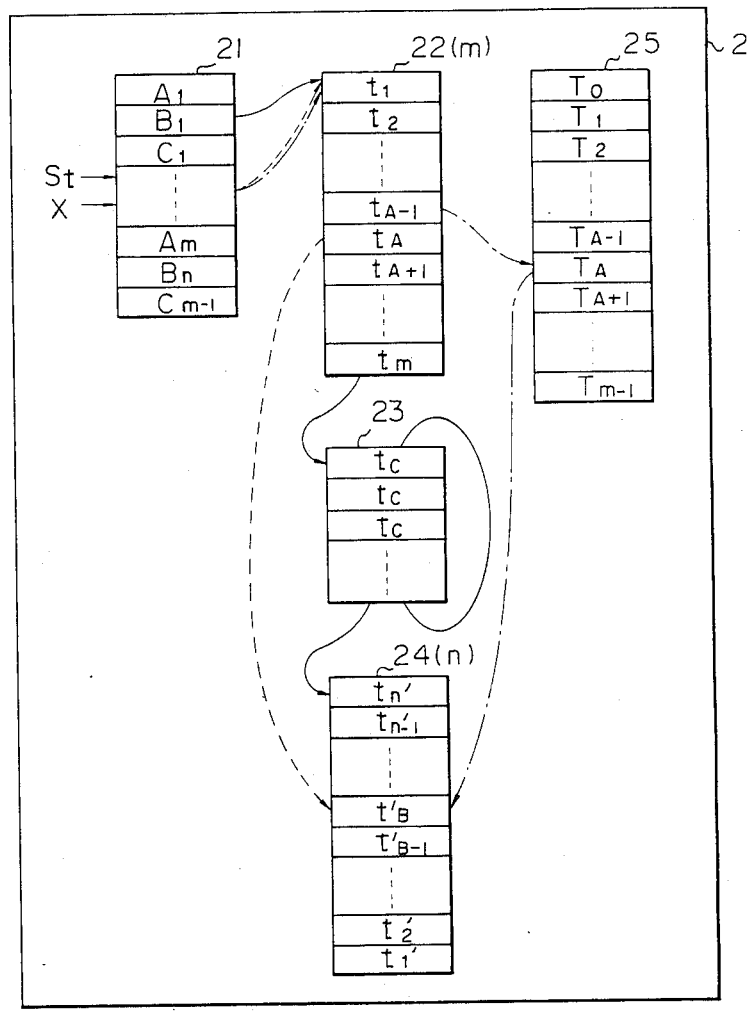
FIG. 4 is a block diagram illustrating the read-only memory (ROM) 2 in the block diagram in FIG. 3A, and indicating general process flows in both a conventional system and according to the present invention.

An example of the contents of the ROM 2 is illustrated in FIG. 4. In FIG. 4, the ROM 2 includes a control table 21, an acceleration table 22 having m addresses, a constant-velocity table 23, a deceleration table 24 having n addresses, and a change point control table 25. The control table 21 stores, at least, the numbers of acceleration steps $A_1\ A_2, \ldots,$ and $A_m$ and the number of deceleration steps $B_1, B_2, \ldots,$ and $B_n$ in its respective addresses. The control table 21 further includes change point control data $C_1, C_2, \ldots,$ and $C_{m-1}$ for determining the address of the change point control table 25. When the number of steps X required to move the load to a target position is supplied to the ROM 2, the necessary number of acceleration steps, the address in the change point control table 25 or the necessary number of constant-velocity steps and the necessary number of deceleration steps, are determined by the control table 21.

The acceleration table 22 stores, at least, time data $t_1$, $t_2, t_3, \ldots,$ and $t_m$ at its respective addresses 1 through m. Assuming that the stepper motor, for example, 8, has four phases A, B, C, and D which are sequentially energized in a one phase energization, i.e., in the order A, B, C, D, A, B, ..., then the time data $t_1$ in the first address represents a period during which the phase A is energized; the time data $t_2$ in the second address represents a period during which the phase B is energized; and so on. The time data $t_1, t_2, t_3, \ldots$ are so determined that the rotor of the stepper motor 8, for example, is gradually accelerated along the practical acceleration curve $C_{a1}$ (FIG. 1).

As for the other tables, the constant-velocity table 23 stores, at least, the same time data $t_c$ in respective addresses so that the rotor is rotated with a constant velocity $v_c$ (FIG. 1). The deceleration table 24 stores, at least, time data $t'_n, t'_{n-1}, \ldots$, and $t'_1$ in its respective addresses 1 through n. Each of the time data $t'_n, t'_{n-1}, \ldots$, and $t'_1$ represents a period during which a corresponding phase A, B, C or D is energized. The time data $t'_n, t'_{n-1}, \ldots$, and $t'_1$ are so determined that the rotor of the stepper motor 8, for example, is gradually decelerated along the practical deceleration curve $C_{d1}$ (FIG. 1).

When the desired number of steps X to move a load or a rotatable member such as the print wheel 81 to a target position is greater than m+n, the normal control mode of operation is used. In this case, the data in the acceleration table 22 are sequentially indexed to provide the time data $t_1, t_2, \ldots$, and $t_m$, then the necessary number of addresses in the constant-velocity table 23 are sequentially indexed to provide the necessary number of the time data $t_c$, and finally, the data in the deceleration table 24 are sequentially indexed to provide the time data $t'_n, t'_{n-1}, \ldots$, and $t'_1$. This process is substantially the same as in the conventional process. No problem occurs in the normal control mode of operation except in the vicinity of the target position during deceleration, as later described in detail.

In the jump control mode, a conventional process is illustrated in FIG. 4 by broken lines. That is, conventionally, when a desired number of steps $S_t$, which is smaller than m+n, is designated, the number of acceleration steps A which is smaller than m and the number of deceleration steps B which is smaller than n are read from the control table 21. The number A indicates that the acceleration table 22 must be indexed to sequentially read out the time data $t_1, t_2, \ldots, t_{A-1}$ and $t_A$. The number B indicates that the deceleration table 24 must be indexed to sequentially read out the time data $t'_B, t'_{B-1}, \ldots, t'_2$ and $t'_1$. The constant-velocity table 23 is not indexed in the jump control mode. That is, in the conventional jump control mode, the control is carried out by using a part of the acceleration table 22 and part of the deceleration table 24. This causes the problem of not stopping instantly, as previously described with reference to FIGS. 1 and 2.

In the present invention, the change point control table 25 is used in the jump control mode. In FIG. 4, the jump control mode according to the present invention is illustrated by dash-dot lines. When the desired number of steps $S_t$ is supplied, the acceleration table 22 is indexed to read the time data $t_1, t_2, \ldots$, and $t_{A-1}$. Then, the change point control table 25 is indexed to read a time data $T_A$. The change point control table 25 stores, at least, time data $T_0, T_1, T_2, \ldots, T_{A-1}, T_A, T_{A+1}, \ldots$, and $T_{m-1}$. Each time data $T_i$ indicates the period between the acceleration and the deceleration and is used for change point control in place of the time data $t_{i+1}$ in the acceleration table 22, when the jump control mode is used. After the time data $T_A$ in the change point control table 25 is read, the deceleration table 24 is indexed to read the time data $t'_B, t'_{B-1}, \ldots$, and $t'_1$. During the period indicated by the time data $T_A$, the rotation has a substantially constant-velocity so that the period functions as a buffer between acceleration and deceleration. A de-energized operation may alternatively be carried out during a part of the period determined by the time data $T_A$, as later described in detail.

Figure 5:
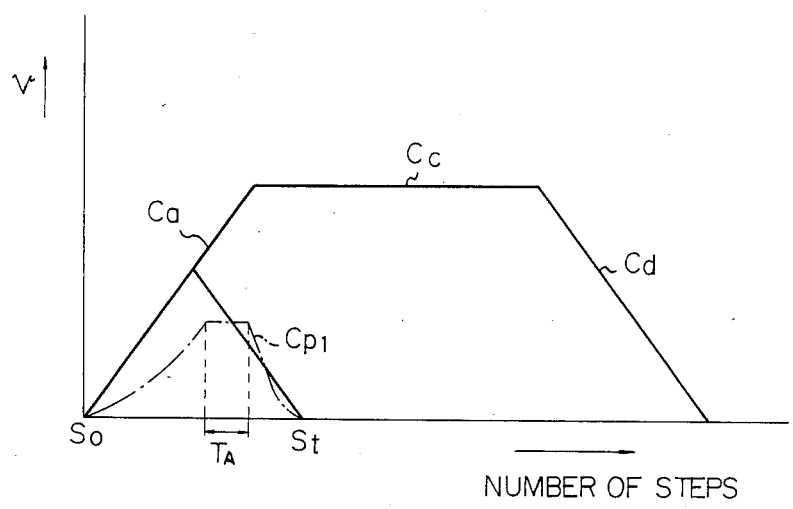
FIG. 5 is a graph of the relationship between the number of steps and the velocity of a stepper motor in the stepper motor control system illustrated in FIG. 3A.

FIG. 5 illustrates a practical curve $C_{p1}$ of the jump control mode according to the present invention. As illustrated in FIG. 5, since the time data $T_A$ is introduced between the acceleration and the deceleration, the conventional problems are eliminated. That is, during the period between the acceleration and the deceleration, the remaining acceleration and the sudden deceleration of the conventional jump control mode do not appear in the practical curve $C_{p1}$.

Figure 6:
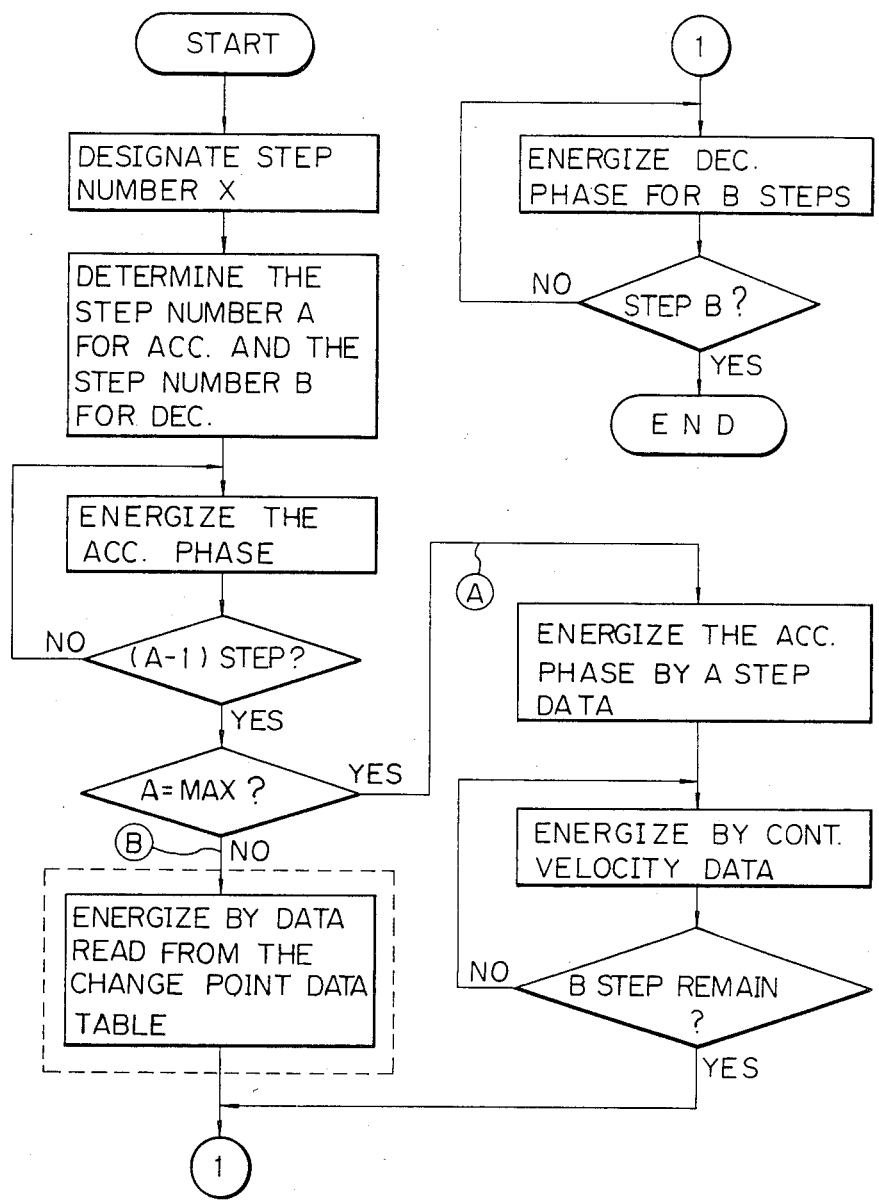
FIG. 6 is a flow chart of the general process flow in the stepper motor control system in FIG. 3A.

FIG. 6 is a general flow chart showing the process flow in the stepper motor control system in FIG. 3. As illustrated in FIG. 6, when a desired step number X is designated, the acceleration step number A and the deceleration step number B are determined. Then, (A−1) acceleration steps are energized. When the step number A is the maximum step number in the acceleration table 22 (FIG. 4), the process proceeds along route Ⓐ which is the normal control mode of operation. When the step number A is not the maximum step number in the acceleration table 22, the process proceeds along route Ⓑ which is the jump control mode of operation according to the present invention. In the jump control mode of operation, a phase subsequent to the phase energized in step (A−1) is energized by using data read from the change point control table 25 (FIG. 4). After this, B steps of deceleration are carried out.

Figure 7A:
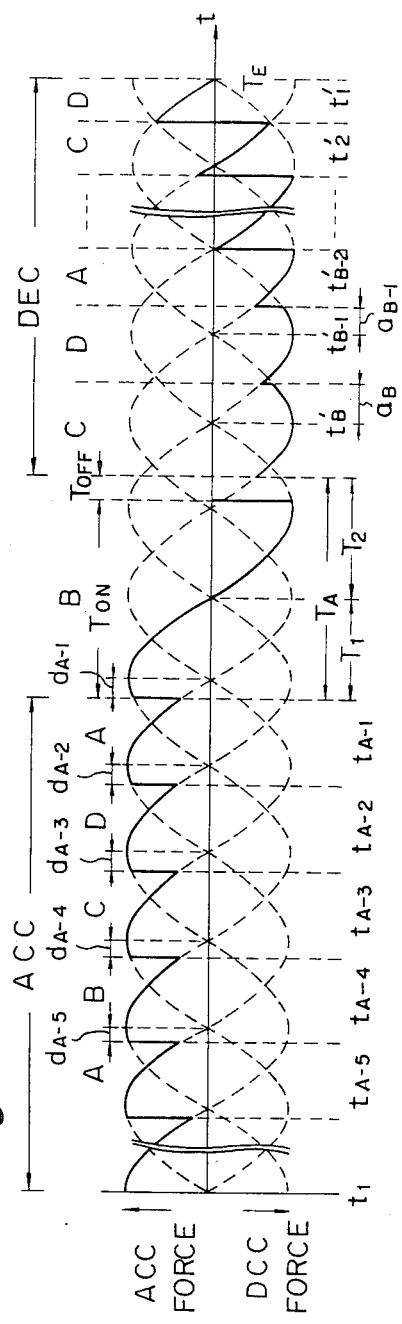
FIG. 7A is a graph of the energized phases of a stepper motor in the process flow in FIG. 6, according to an embodiment of the present invention.

FIG. 7A is a graph illustrating energized phases of a stepper motor in the process flow in FIG. 6 when the jump control mode of operation is carried out. In FIG. 7A, the acceleration period ACC, the change point control period $T_A$, and the deceleration period DEC are illustrated. In the acceleration period ACC and the deceleration period DEC, the four phases A, B, C and D are cyclically energized. In the acceleration period ACC, each phase is positively energized to generate an acceleration force. In the deceleration period DEC, each phase, except for several phases energized in the vicinity of a time $T_E$ at which the rotor of the stepper motor stops its rotation, is negatively energized to generate a deceleration force. Each phase in the acceleration period ACC starts to be energized earlier, by a delay time $d_1, d_2, \ldots, d_{A-2}$, or $d_{A-1}$, than the zero cross point of the sine curves. This means that, during the acceleration period ACC, the rotor R is slightly delayed by the delay time $d_1, d_2, \ldots, d_{A-2}$, or $d_{A-1}$ from the position corresponding to the energized coil, as described before with reference to FIG. 1. Each phase in the deceleration period DEC starts to be energized later by an advance time $a_1, a_2, \ldots, a_{B-1}$, or $a_B$. This means that, during the deceleration period DEC, the rotor R is slightly advanced by the advance time $a_1, a_2, \ldots$, or $a_B$ from the position corresponding to the energized coil.

During the change point control (CPC) period $T_A$, the acceleration state is changed to the deceleration state. This change is carried out by energizing a phase, for example, subsequent to the same phase energized in the acceleration period ACC, for an appropriate period $T_A$. The period $T_A$ is theoretically or experimentally determined to smoothly join the acceleration state with the deceleration state.

In FIG. 7A, the final phase energized in the acceleration period ACC is the phase A. Therefore, the phase B which follows phase A is energized in the change point control period $T_A$. During the first half of the period $T_A$, i.e., during a period $T_1$, angular displacement acceleration energy is applied to the rotor of the stepper motor. During the last half of the period $T_A$, i.e., during the period $T_2$, deceleration energy is applied to the rotor. The period $T_A$ is determined to compensate the acceleration energy with the deceleration energy or the deceleration energy plus the friction energy in the stepper motor during the change point period. After the change point control period $T_A$, the phase subsequent to the phase energized in the change point control period $T_A$ is energized, and then phases A, B, C and D are cyclically energized. Thus, the conventional problem of sudden deceleration or oscillation at the change point between acceleration and deceleration or during the deceleration is substantially eliminated, as can be seen in FIG. 7A.

In this embodiment, the current supplied to phase B during the change point control period $T_A$ is substantially constant, so that the rotor of the stepper motor is rotated at a substantially constant velocity. To smoothly join the acceleration state with the deceleration state, it is preferable that the speed and position of the rotor at the end of the change point control period $T_A$ coincide, as much as possible, with the predetermined or necessary speed and the predetermined or necessary position for the beginning of the deceleration period determined by table 24 (FIG. 4). In practice, however, there are problems in achieving the above coincidence. First, the speed and the position of the rotor at the end of the final acceleration period $t_{A-1}$ do not always coincide with those at the beginning of the first deceleration period $t'_B$. Second, the rotor generally receives friction force during the change point control period $T_A$, so that the speed of the rotor is reduced due to the friction force. Therefore, even when the period $T_A$ is calculated to compensate the acceleration energy with the deceleration energy, the speed and position of the rotor at the end of the change point control period $T_A$ do not always coincide with the predetermined speed and position.

In order to reduce the disadvantage caused by the above-mentioned problems, in another embodiment of the present invention, different currents may be alternatively supplied to the phase B during the change point control period $T_A$. Preferably, the period $T_A$ consists of an ON period $T_{ON}$ and an OFF period $T_{OFF}$, as illustrated in FIG. 7A. During the ON period $T_{ON}$, a predetermined current is supplied to the phase B. During the OFF period $T_{OFF}$, no current is supplied to any one of the phases A, B, C and D, that is, all phases are de-energized. The OFF period $T_{OFF}$ is properly determined theoretically or experimentally to achieve, as much as possible, the coincidence of the position and the speed at the end of the period $T_A$ with the position and the speed at the beginning of the period $T'_B$.

For example, if the friction force is relatively large and a relatively large amount of friction energy is consumed during the period $T_A$, the OFF period is made comparatively long, so that the deceleration period in the CPC period $T_A$ is limited. Also, if the speed at the end of the periof $T_{A-1}$ is slower than the speed at the beginning of the period $t'_B$, a long OFF period is provided in the change point control period $T_A$. For example, the OFF period may be longer than a quarter of one cycle of the sine curve.

Figure 7B:
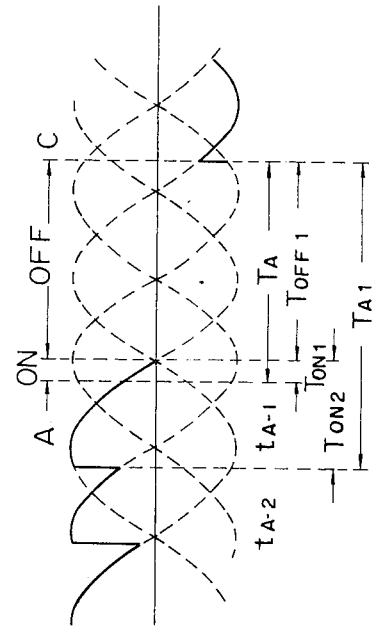
FIG. 7B is a graph of phase engerization illustrating change point control according to another embodiment of the present invention.

FIG. 7B illustrates still another embodiment of the control during the change point control period $T_A$. In this embodiment, the change point control period $T_A$ consists of a short ON perid $T_{ON1}$ and a long OFF period $T_{OFF1}$. During the short ON period $T_{ON1}$, the phase A energized in the last period $T_{A-1}$ of the acceleration period ACC continues to be energized until the sine curve of the phase A reaches a zero cross point. During the long OFF period $T_{OFF1}$, all phases are de-energized. Thus, in this embodiment, only acceleration occurs during the short ON period $T_{ON1}$, and deceleration is caused only by friction during the change point control period $T_A$. The acceleration energy, generated during the short ON period $T_{ON1}$, is compensated for by friction energy during the period $T_A$. Accordingly, the embodiment in FIG. 7B is most preferably applied when the speed of the rotor at the end of the period $T_{A-1}$ is equal to the speed at the beginning of the period $t'_B$.

In place of energizing the phase A during the short ON period $T_{ON1}$, the subsequent phase B may be energized. However, when the period $T_{ON1}$ is very short, so that CPU 1 (FIG. 3) cannot control the time period $T_{ON1}$, it is preferable to energize the same phase as the phase (A) energized in the last period $T_{A-1}$ of the acceleration period, and an ON period $T_{ON2}$, i.e., the short period $T_{ON1}$ plus the last period $T_{A-1}$, is loaded into the timer 10 (FIG. 10). Accordingly, in the embodiment in FIG. 7B, the change point control table 25 must store the time data $T_{ON2}$ and the time data $T_{OFF1}$ instead of the time data $T_A$, and the change point control is carried out after the (A−2) step of the acceleration.

Figure 8B:
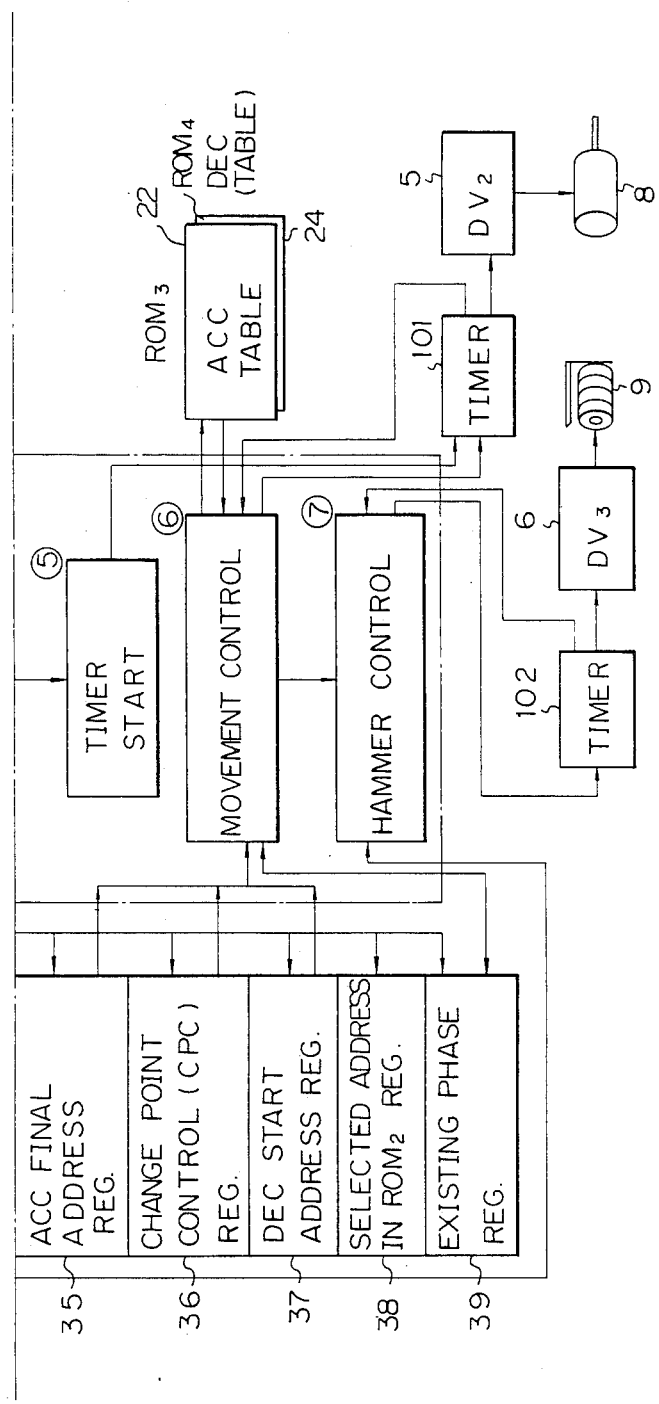
FIG. 8 is a process flow and block diagram for a detailed process flow of a stepper motor control system, according to an embodiment of the present invention.

FIG. 8 is a process flow and block diagram of a stepper motor control system according to an embodiment of the present invention. Although in FIG. 8 the system is illustrated in more detail than in the block diagrams in FIGS. 3 and 4, the same reference numerals used in FIGS. 3 and 4 indicate the same parts. The system shown in FIG. 8 includes the hardware, CPU 1, four ROMs and a RAM 3. The ROMs include a ROM 200 (ROM₁), which stores position codes $P_0$, $P_1$, . . . , and $P_n$ of the characters and hammer strength codes $H_0$, $H_1$, . . . , and $H_n$ corresponding to the position codes; ROM 250 (ROM 2), which stores the print wheel control table of FIG. 9; the acceleration table 22 (ROM₃) of FIG. 4 and in more detail in FIG. 10; and the deceleration table 24 (ROM₄) of FIG. 4 and in more detail in FIG. 11. The RAM 3 includes a target position register 31, a hammer strength register 32, an existing position register 33, an amount of movement (AM) register 34, an acceleration final address register 35, a change point control (CPC) data register 36, a deceleration start address register 37, a selected address in ROM₂ register 38 and an existing phase register 39. Also included in FIG. 8 are timers 101 and 102; the drivers 5 and 6; the stepper motor 8 for driving a print wheel (not shown); the hammer driver 9; and the input buffer circuit 12.

In FIG. 8, mainly the components of a print wheel driving system including hardware and software are illustrated. In practice, however, a space mechanism driving system, which is substantially the same as the print wheel driving system, and the other driving systems such as a carriage return control system are also included in the stepper motor control system in FIG. 8. In the block of the CPU 1, various processing steps 1 through 8 are illustrated. The stepper motor control system in FIG. 8 operates as follows.

When a print code or a space code is input into the input buffer circuit 12, step 1 determines whether the input code is a space code or a print code. If the input code is a space code SC, a space motor drive routine 8 is carried out. If the input code is a print code PC expressing a desired character to be printed, step 2 accesses $ROM_1$ 200, by using the print code as an address, to read a position code $P_i$ and the corresponding hammer strength code $H_i$, and stores them in the target position register 31 and the hammer strength register 32. Then, step 3 calculates the amount of angular displacement of the print wheel (not shown) by subtracting the contents in the target position register 31 from the contents in the existing position register 33, which contains the existing position of the print wheel, or the starting position of the print wheel. The calculated amount of angular displacement, which corresponds to the desired number of steps of the stepper motor 8, is stored in the AM register 34. After the calculation, the existing position register 33 is updated by the contents in the target position register.

Then, in step 4, based on the contents in the AM register 34, the $ROM_2$ 250 is accessed, by using the desired number of steps as an accessing address i, to read control data such as the necessary number of acceleration steps (ACC steps), the necessary number of deceleration steps, and the change point control data (see FIG. 9). The accessing address i is stored in the selected address in $ROM_2$ register 38. The number of the acceleration steps is read from $ROM_2$ 250 and stored in the acceleration final address register 35. The number of the acceleration steps indicates the final address for accessing the $ROM_3$ 22. The number of the deceleration steps is read from $ROM_2$ 250 and stored in the deceleration start address register 37. The number of deceleration steps indicates the start address for accessing the $ROM_4$ 24. The change point control (CPC) data is read from $ROM_2$ 250 and stored in the CPC register 37. In step 5, the timer 101 is started.

In step 6, movement control for driving the stepper motor 8 is carried out. That is, the time data for each step of acceleration is first read from the $ROM_3$ 22, step by step. For each step, data is loaded into the timer 101. During each period determined by the time data, the driver 5 drives the stepper motor 8 by energizing a specified phase with a specified electric current. The method for determining the phase to be energized and the current to be supplied to the phase will be described later in detail. After the final step of acceleration, the CPU 1 reads the contents stored in the change point control data register 36. Then, the time data in the CPC data is loaded into the timer 101. During the period indicated by the time data in the CPC register 36, the driver 5 drives the stepper motor 8 to perform the change point control. In the change point control, the phase to be energized and the current to be supplied to the phase are determined by the change point control data, as later described in detail. After the change point control, the time data for each step of deceleration is read from the $ROM_4$ 24 step by step. For each step, data is loaded into the timer 101 and the deceleration control is performed in a manner similar to the acceleration control. Thus, the rotor of stepper motor 8 rotates by the desired number of steps and stops at the target position.

After the rotor stops, a hammer control process 7 is carried out by reading the contents stored in the hammer strength register 32. Based on the hammer strength data corresponding time data is loaded into the timer 101. Then, the driver circuit 6 drives the hammer driver 9 so that the designated character is printed with an appropriate strength.

FIG. 9 indicates the contents in the $ROM_2$ 250 in the system in FIG. 8. In FIG. 9, the $ROM_2$ 250 has a print wheel control table. In the table, i is an address of the $ROM_{22}$ 250. The maximum address is equal to the number of steps of the rotor for a half rotation. This is because, the movement of the designated character mounted on the print wheel 81 to the target position can be carried out by rotating the rotor within a half rotation even when the calculated desired amount of angular displacement is greater than the steps required for a half rotation of the rotor. That is, if the calculated desired amount of angular displacement is equal to or smaller than the number of steps required for a half rotation of the rotor, the rotor is rotated in the clockwise direction. If the desired amount of angular displacement is greater than the number of steps required for a half rotation of the rotor, the rotor is rotated in the counterclockwise direction.

The print wheel 81 (FIG. 3B) rotates by one full rotation in 192 steps in this example. Therefore, the maximum address in the $ROM_2$ 250 is 96 in this example. The address i corresponds to the desired number of steps S, or, in other words, the total number of steps. When the desired number of steps S is equal to or smaller than 96, i=S. When the desired number of steps S is greater than 96, i=192−S.

At each address i, the number of acceleration steps, the number of deceleration steps, and change point control data are stored. The change point control data includes a first time data $t_{c1}$ for determining the ON period $T_{ON}$ (FIG. 7A) in the change point control period, a first phase control data, an absolute phase control data, a second time data $t_{c2}$ for determining the OFF period $T_{OFF}$ for example, and a second phase control data.

The first phase control data consists of a first phase data $P_{c1}$ and a first current control data $C_{c1}$. The first phase data $P_{c1}$ includes a parameter for determining the phase data to be stored in the existing phase register 39 (FIG. 8). The first current control data $C_{c1}$ includes a parameter for determining the electric current to be supplied to the phase. The phase data specifying the existing phase being energized is stored in the existing phase register 39.

The absolute phase control data consists of an absolute phase data $P_{ab}$ and an absolute current control data $C_{ab}$. The absolute phase data $P_{ab}$ absolutely determines the phases deenergized during the OFF period $T_{OFF}$ (FIG. 7A) regardless of the existing phase energized before the OFF period $T_{OFF}$. The absolute current control data $C_{ab}$ absolutely determines not to supply current to all phases during the OFF period $T_{OFF}$.

The second phase control data consists of a second phase data $P_{c2}$ and a second current control data $C_{c2}$. The second phase data $P_{c2}$ includes a parameter for determining the phase to be energized immediately after the OFF period $T_{OFF}$. The second current control data $C_{c2}$ includes a parameter for determining the electric current to be supplied to the phase which is energized immediately after the OFF period $T_{OFF}$.

FIG. 10 illustrates the contents of the $ROM_3$ 22 in the system in FIG. 8. The $ROM_3$ 22 contains an acceleration table. The acceleration table includes a number of addresses $A_j$ (j=1, 2, ..., m). At each address $A_j$, an acceleration time data $t_j$ indicates an acceleration period for one of the acceleration steps, an acceleration phase data $P_j$ includes a parameter to determine the phase to be energized in the next step after the existing phase is energized and the acceleration current control data $C_j$ includes a parameter to determine the current to be supplied to the phase in the next step.

FIG. 11 illustrates the constants of the $ROM_4$ 24 in the system in FIG. 8. The $ROM_4$ 24 contains a deceleration table including a number of addresses $A_k$ (k=n, ..., 3, 2, 1). At each address $A_k$ is a time data $t'_k$, a phase data $P'_k$ and a current control data $C'_k$. The function of these data is similar to that of the data in the acceleration table.

In one-phase energization, that is, when the phases A, B, C and D are cyclically energized by a constant electric current, the phase data in each of the print wheel control table, the acceleration table, and the deceleration table merely has a parameter to advance the existing phase from A to B, from B to C, from C to D, or from D to A, and the current control data in each table is not necessary. The above-mentioned one-phase energization, however, is only one example of operation.

In practice, two-phase energization is more commonly used. In two-phase energization, two phases are simultaneously energized for each step. Further, in the vicinity of the target position, that is, in several steps near the end of the deceleration period, a fine control of the rotation of the rotor is carried out according to the present invention. This two-phase energization and the fine control of the rotation will be described later in more detail with reference to the drawings. In such two-phase energization or fine control, the above-mentioned phase data and current control data effectively determine the next phase or phases to be energized and the current to be supplied to the phase or phases. This will also be described later in detail.

Figures 2, 12C:
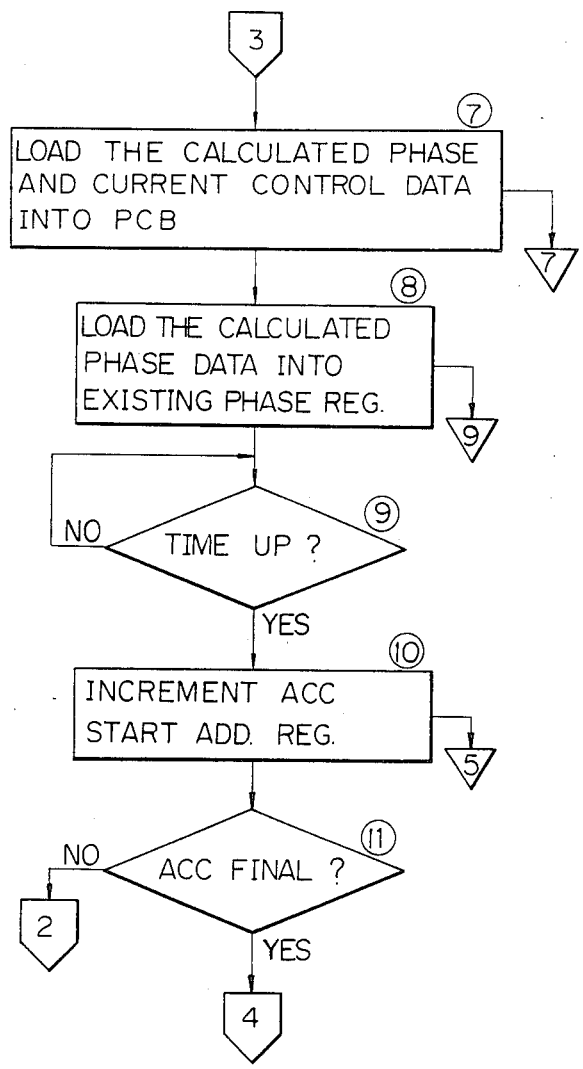
FIG. 12C is a detailed flow chart of the acceleration control process in the process illustrated in FIG. 8.

Regarding the process flow in FIG. 8, a more detailed process flow will now be described with reference to FIGS. 12A through 12F. FIG. 12A is a detailed process flow chart of the extraction of control data executed in step 4 of the process flow illustrated in FIG. 8. In FIG. 12A, it is assumed that the desired amount of movement, i.e., the total number of necessary steps, is already stored in the amount of movement (AM) or angular displacement register 34. In the first step ①, the contents of the AM register 34 are read to determine the direction of rotation of the print wheel 81. If the total number of steps is equal to or smaller than 96, a logic value of "0", for example, is stored in a direction register 341. If the total number of steps is greater than 96, a logic value of "1" is stored in the direction register 341. In the second step ②, the number of acceleration steps are read from the $ROM_2$ 250 to load the start address of the acceleration, usually the number 1, into an acceleration start address register 351, and to load the final address of the acceleration into the acceleration final address register 35. In the third step ③, the number of deceleration steps are read from the $ROM_2$ 250 to load the start address of the deceleration into the deceleration start address register 37, and to load the final address of the deceleration, usually the number 1, into a deceleration final address register 371. In the fourth step ④, the selected address i for accessing the $ROM_2$ 250 is stored in the selected address in $ROM_2$ register 38. Thus, the extraction of control data is completed.

Figures 13, 13A:
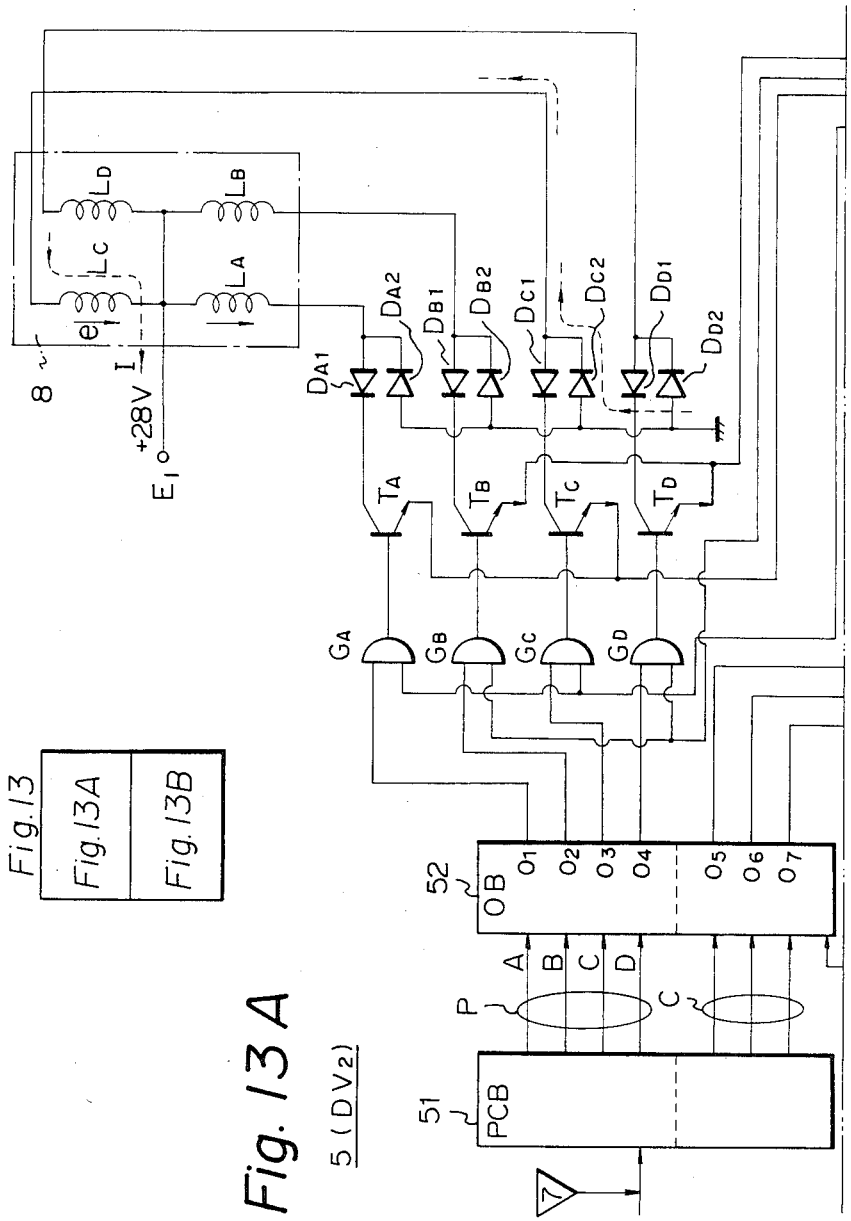
FIG. 13 is a circuit diagram of a driver circuit in the stepper motor control system according to an embodiment of the present invention.
Figure 13B:
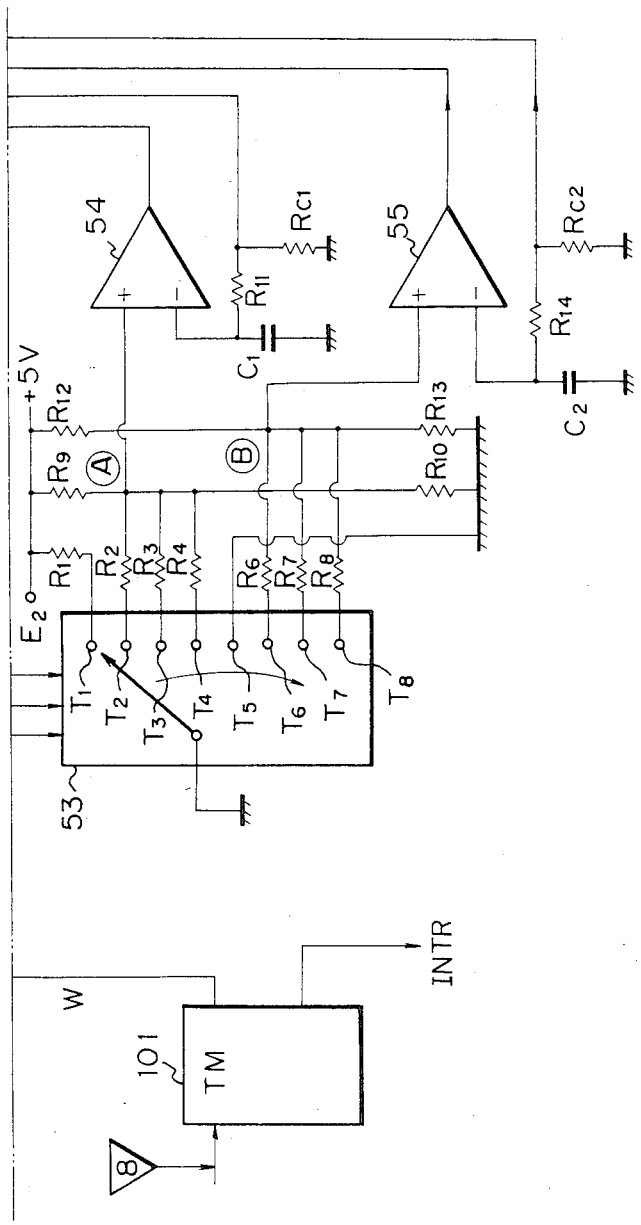

FIG. 12B is a detailed process flow chart of start control executed in part of step 6 in the process flow illustrated in FIG. 8. In FIG. 12B, in the first step ①, the contents of the direction register 341 (FIG. 12A), a P and C register 391 and the existing phase register 39 are read. The P and C register 391 stores phase data and current control data and, at this stage, stores the data used in the final step in the previous process of the print wheel drive. In the second step ②, based on the data which was read, the first phase to be energized and the electric current to be supplied to the first phase are calculated. In one-phase energization, the next phase to be energized is calculated by simply advancing the existing phase, i.e., from A to B, from B to C, and so on, and the current supplied to each phase is the same and constant. In the third step ③, the calculated phase data and the current data are loaded into a phase change buffer (PCB) 51 (FIG. 13) in the driver circuit ($DV_2$) 5 (FIG. 8). In the fourth step ④, the calculated phase data is loaded into the existing phase register 39. In the fifth step ⑤, the short time data $t_s$ is loaded into the timer 101 (FIG. 8 and FIG. 13). This short time data $t_s$ is used to initially write the contents of the PCB 51 (FIG. 13) into an output buffer circuit 52 (FIG. 13). In the sixth step ⑥, the period of time determined by the short time data $t_s$ is counted. When the period of time has passed, the phase data and the current control data in the PCB 51 are written into an output buffer circuit 52 (FIG. 13). Thus, the start control process is completed.

FIG. 12C is a detailed process flow chart of the acceleration control executed by a part of step ⑥ in the general flow in FIG. 8. In FIG. 12C, in the first step ①, the contents of the acceleration start address register 351, which at this stage contains the first address for carrying out the first step of the rotation of the print wheel, are read. In the second step ②, by using the contents of the acceleration start address register 351 as an address $A_j$ for accessing the $ROM_3$ 22, the time data $t_j$ and the time data $t_1$ are read. In the third step ③, the time data $t_j$ is loaded into the timer 101. In the fourth step ④, by accessing the same address of the $ROM_3$ 22 as in the above step ②, a phase data $P_j$, a current control data $C_j$, the phase data $P_1$ and the current control data $C_1$, are read from the $ROM_3$ 22. The fifth step ⑤ through the eighth step ⑧, are similar to the first step ① through the fourth step ④ in the start control process in FIG. 12B. Thereby, the PCB 51 (FIG. 13) is updated to store the phase data designating a phase to be energized in the next step of rotation and the current control data designating an electric current to be supplied to the phase, and also the existing phase register 39 is updated to store the same phase data as that stored in the PCB 51. In the ninth step ⑨, the period determined by the time data $t_j$ stored in the timer 101 is counted. During the period, the acceleration step for the time data $t_j$ is carried out. In the tenth step ⑩, the contents of the acceleration start address register 351 are incremented to designate the second step of rotation. The above described steps 1 through 10 are repeated until the contents in the acceleration start address register 351 represents the final step of acceleration.

Figures 2, 12D:
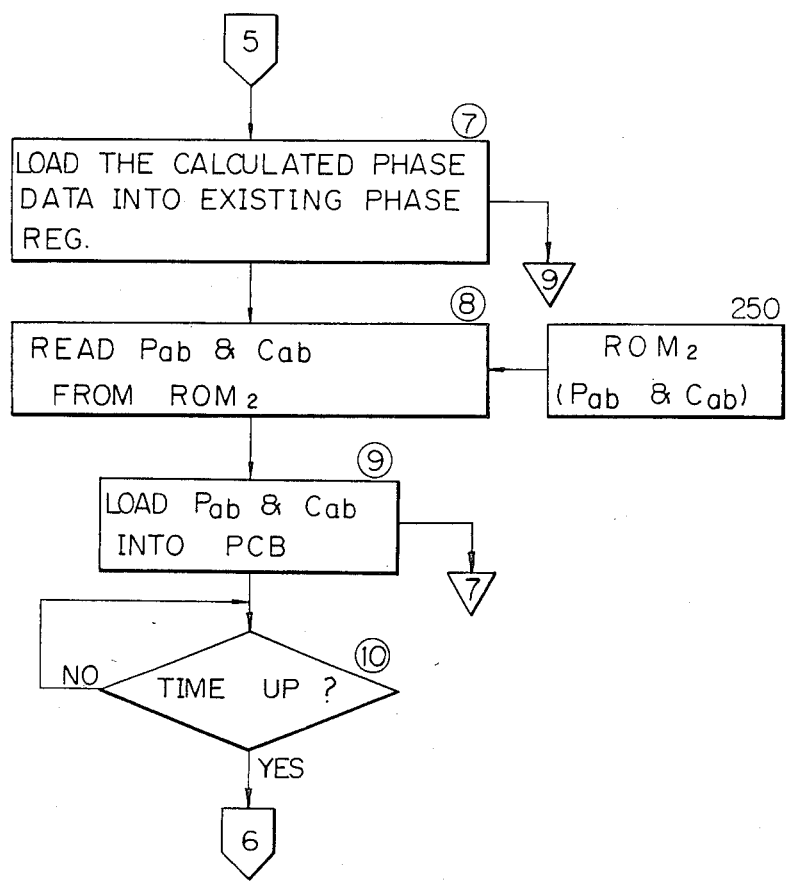
FIG. 12D is a detailed flow chart of a first part of the change point control in the process illustrated in FIG. 8.

The change point control process, to which the present invention is most pertinent, will now be described with reference to FIGS. 12D and 12E. In FIG. 12D, a part of the change point control process is illustrated, in which, in the first step ①, the selected address in ROM₂ register 38 is read. In the second step ②, by using the data read in the first step ① as an accessing address, the ROM₂ 250 is accessed to read the first time data $t_{c1}$ which determines the ON period $T_{ON}$ (FIG. 8A). The third step ③ through the sixth step ⑥ are similar to the second step ② through the fifth step ⑤ in the acceleration control in FIG. 12C except that the time data $t_{c1}$, the phase data $P_{c1}$, and the current control data $C_{c1}$ are those for the change point control process. In the seventh step ⑦ in FIG. 12D, the calculated phase data is loaded into the existing phase register 39 (FIG. 12B). In the eighth step ⑧, the ROM₂ 250 is accessed to read the absolute phase data $P_{ab}$ and the absolute current control data $C_{ab}$. In the ninth step ⑨, the absolute phase data $P_{ab}$ and the absolute current control data $C_{ab}$ are loaded into the PCB 51. It should be noted that, unlike the acceleration process in FIG. 12C, the phase data $P_{c1}$ and the current control data $C_{c1}$ are not loaded into the PCB 51 in the change point control process. In the tenth step ⑩, the ON period $T_{ON}$ (FIG. 8A) determined by the time data $t_{c1}$ is counted by the timer 101 so that, during the ON period, the phase designated in the final step in the acceleration process is energized.

Figures 2, 12E:
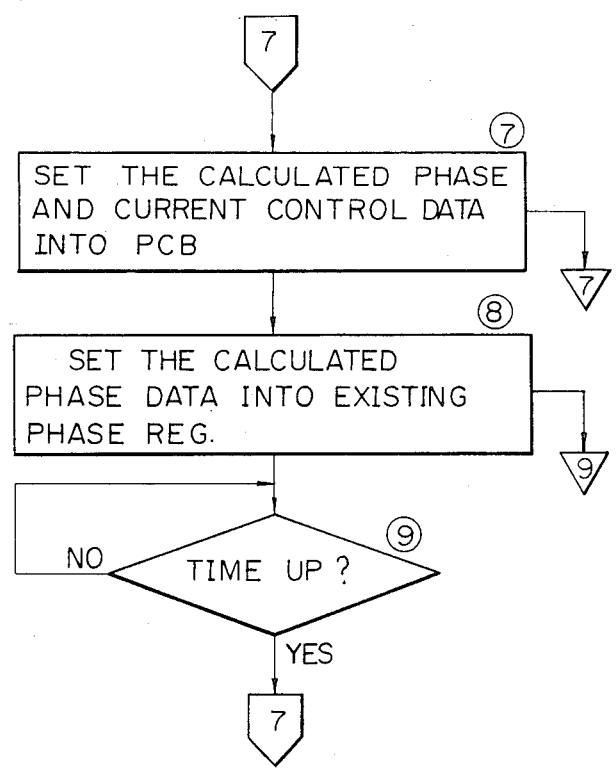
FIG. 12E is a detailed flow chart of the second part of the change point control in the process illustrated in FIG. 8.

Referring to FIG. 12E, another part of the change point control process is illustrated, in which the first step ① through the sixth step ⑥ are similar to the first step ① through the sixth step ⑥ in FIG. 12D, except that, in FIG. 12E, the time data, the phase data and the current control data read are $t_{c2}$, $P_{c2}$, and $C_{c2}$, respectively. In the seventh step ⑦, the calculated phase data and the calculated current control data are loaded into the PCB 51 (FIG. 13). The data loaded into the PCB 51 are used for controlling the first step in the subsequent deceleration process. In the eighth step ⑧, the calculated data is also loaded into the existing phase register 39. In the ninth step ⑨, the period determined by the time data $t_{c2}$ is counted by the timer 101. During the period, the phase designated by the absolute phase data $P_{ab}$ is energized with an electric current designated by the absolute current control data $C_{ab}$. In one embodiment, the phase energized during the period determined by the time data $t_{c2}$ is the same as the precedingly energized phase during the ON period $T_{ON}$, and is energized with the same electric current as in the ON period. In another embodiment, none of the phases is energized during the period designated by the time data $t_{c2}$. After the period is over, the change point control is completed.

Figures 2, 12F:
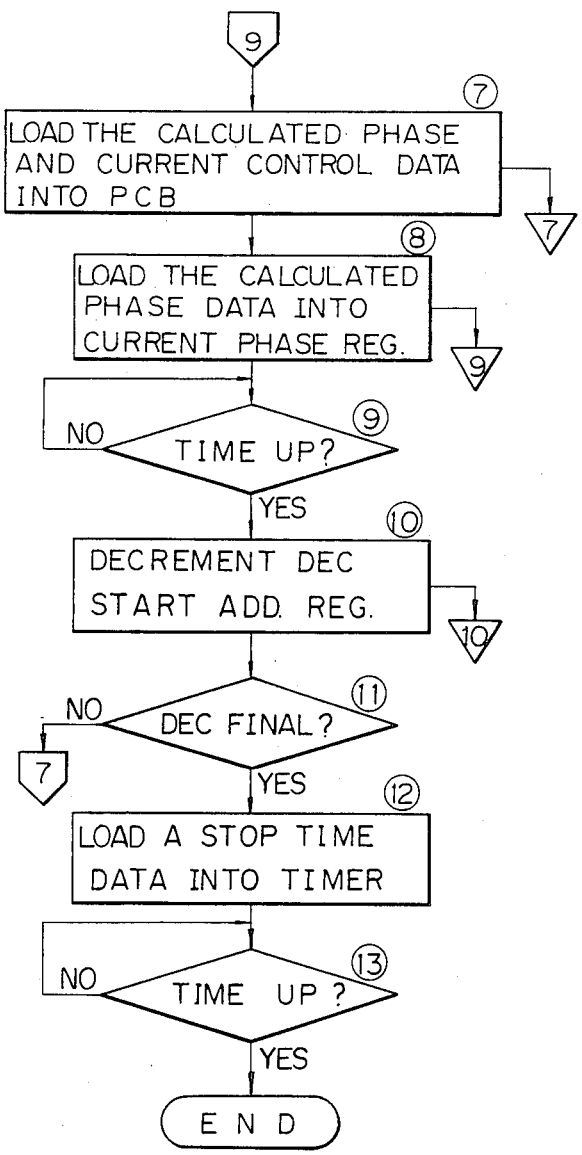
FIG. 12F is a detailed flow chart of the deceleration control in the process illustrated in FIG. 8.

FIG. 12F illustrates a detailed process flow of the deceleration control executed by a part of the step ⑥ in the general flow in FIG. 8. In FIG. 12F, the deceleration process executed by the steps ① through ⑪ is substantially the same as the acceleration process executed by the steps ① through ⑪ in FIG. 12C, except that, in the deceleration process of FIG. 12F, the data read are time data $t'_k$, phase data $P'_k$ and current control data $C'_k$, which are read from the ROM₄ 24, and that, in step ⑩, the contents in the deceleration start address register 37 are decremented. The steps ① through ⑩ in the deceleration process of FIG. 12F are repeated until the contents in the deceleration start address register 37 represent the final step of deceleration. After this, in step ⑫, stop time data is loaded into the timer 101. The stop time data designates a period necessary to stop the print wheel 81. In step ⑬, the period necessary to stop the print wheel 81 is counted. When the period is counted, the designated character mounted on the wheel stops at the desired position.

FIG. 13 is a circuit diagram illustrating in detail the driver circuit (DV₂) 5 in a stepper motor control system according to an embodiment of the present invention. The circuit diagram in FIG. 13 is adapted to select a desired character mounted on the print wheel 81 (FIG. 3B). In FIG. 13, the driver circuit 5 includes the PCB 51, the output buffer circuit (OB) 52, the timer 101, an analog switch 53, comparators 54 and 55, four AND gates $G_A$, $G_B$, $G_C$ and $G_D$, four NPN transistors $T_A$, $T_B$, $T_C$ and $T_D$, and the stepper motor 8 including four coils $L_A$, $L_B$, $L_C$ and $L_D$. The driver circuit 5 further includes four diodes $D_{A1}$, $D_{B1}$, $D_{C1}$ and $D_{D1}$ having cathodes connected to the collectors of the transistors $T_A$, $T_B$, $T_C$ and $T_D$, respectively, and having anodes connected to first ends of the coils $L_A$, $L_B$, $L_C$, and $L_D$, respectively. The second ends of these coils are connected to a first power supply $E_1$ of, for example, 28 V. The driver circuit 5 still further includes four diodes $D_{A2}$, $D_{B2}$, $D_{C2}$ and $D_{D2}$ having cathodes connected to the first ends of the coils $L_A$, $L_B$, $L_C$ and $L_D$, respectively, and having anodes connected to ground. The analog switch 53 has eight output terminals $T_1$ through $T_8$. The terminal $T_1$ is connected through a resistor $R_1$ to a second power supply $E_2$ of, for example, 5 V. The terminals $T_2$ through $T_4$ are connected via resistors $R_2$ through $R_4$, respectively, to a noninverted terminal of the comparator 54. The terminal $T_5$ is grounded. The terminals $T_6$ through $T_8$ are connected via resistors $R_6$, $R_7$ and $R_8$, respectively, to a noninverted terminal of another comparator 55. Between the noninverted terminal of the comparator 54 and the second power supply $E_2$, a resistor $R_9$ is connected. Between the noninverted terminal of the comparator 54 and ground, a resistor $R_{10}$ is connected. Between the inverted terminal of the comparator 54 and ground, a capacitor $C_1$ is connected in parallel with series-connected resistor $R_{11}$ and current detecting resistor $R_{C1}$. The emitters of the transistors $T_A$ and $T_C$ are connected, through the resistor $R_{C1}$, to ground. Between the noninverted terminal of the comparator 55 and the second power supply $E_2$, a resistor $R_{12}$ is connected. Between the noninverted terminal of the comparator 55 and ground, a resistor $R_{13}$ is connected. Between the inverted terminal of the comparator 55 and ground, a capacitor $C_2$ is connected in parallel with series-connected resistor $R_{14}$ and current detecting resistor $R_{C2}$.

The output buffer circuit 52 has four outputs $O_1$, $O_2$, $O_3$ and $O_4$ for providing the phase data P the phases A, B, C and D, respectively, and has three outputs $O_5$, $O_6$ and $O_7$ for providing the current control data C to the analog switch 53. The outputs $O_1$, $O_2$, $O_3$ and $O_4$ are connected to one input of the AND gates $G_A$, $G_B$, $G_C$ and $G_D$, respectively. The other inputs of the AND gates $G_A$ and $G_C$ are connected to the output of the comparator 54. The other inputs of the AND gates $G_B$ and $G_D$ are connected to the output of the comparator 55.

The operation of the circuit in FIG. 13 is as follows. The PCB 51 stores, by means of firmware, phase data P designating the phase to be energized and current control data designating the control current to be supplied to the phase, as before described in detail. The data stored in the PCB 51 are transferred into the output buffer circuit 52 when it receives a write-in signal W from the timer 101, which provides the write-in signal after the period set in the timer 101 has passed. The timer 101 also provides an interruption signal INTR to the CPU 1 (FIG. 3A).

The analog switch 53 can select one of the eight output terminals $T_1$ through $T_8$ to be grounded, depending on the three bits of the current control data P. When one of the output terminals $T_1$ through $T_8$ is selected to be grounded, the potentials at the noninverted terminals of the comparators 54 and 55 i.e., the potentials at points Ⓐ and Ⓑ, are determined. These potentials are used as reference voltages for the comparators 54 and 55. When a current flows from the first power supply $E_1$ through the coil $L_A$, the diode $D_{A1}$, the transistor $T_A$ and the current detecting resistor $R_{C1}$ to ground, a voltage is produced across the resistor $R_{C1}$. Thus, a voltage is applied to the inverted terminal of the comparator 54. If the voltage at the terminal of the comparator 54 is higher than the reference voltage at point Ⓐ, the comparator 54 provides a high level control signal to the AND gates $G_A$ and $G_C$. In this state, when the phase data P designates the phase A to be energized, a high level signal is provided from the output $O_1$ of the output buffer circuit 52 to the AND gate $G_A$. Thus, the transistor $T_A$ receives the high level signal at its base, so that the transistor $T_A$ becomes stably conductive. As a result, the phase A is selected to be energized. The other phases B, C and D can be selected in a similar manner.

An advantage is obtained by the circuit configuration in FIG. 13. That is, when the transistor $T_A$ is suddenly switched from an ON state to an OFF state, an electromotive force e is induced across the coil $L_C$, due to electromagnetic induction. This electromotive force e is far greater than the first power supply voltage $E_1$, because of the sudden cut off of the transistor $T_A$. Therefore, a current I flows through a path from the coil $L_C$ to the first power supply $E_1$, originating at ground and passing through the diode $D_{C2}$ to the coil $L_C$. Thus, the energy stored in the coil $L_A$ is returned back to the first power supply $E_1$ by the coil $L_C$, and an element for consuming the induced electric power is not necessary in the circuit in FIG. 13.

This feature is advantageous over the conventional driver circuit, because, conventionally, elements for consuming the induced electric power are necessary and considerable amount of heat is generated by the power consuming elements. In additin, the power consuming elements in the conventional driver must have a tolerance voltage higher than the induced voltage due to electromagnetic induction. Further, since the electric power due to electromagnetic induction is consumed by the power consuming elements, the efficiency of the first power supply is deteriorated.

Figure 14:
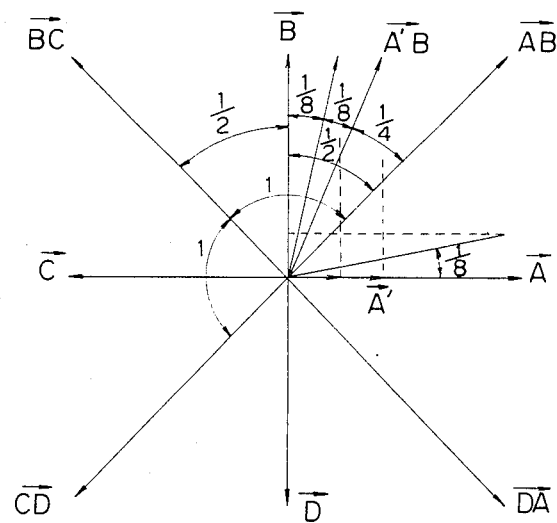
FIG. 14 is a graph of phases to be energized used in explaining fine control near the target position according to the present invention.

In the foregoing description of the embodiments, mainly a one-phase energizing method is described in order to understand the embodiments more easily. In practice, however, one-two phase energization or two phase-energization is more often used. Further, according to an embodiment of the present invention, fine control of energization is also performed in the vicinity of the target position. These methods for energizing the phases are described with reference to FIG. 14. In FIG. 14, currents supplied to the four phases A, B, C and D are expressed by four vectors $\vec{A}, \vec{B}, \vec{C}$ and $\vec{D}$, and each adjacent pair of vectors expressing the four currents are separated in phase by 90 degrees from each other. However, the stepping angle X of rotation of the rotor for each step of energization may be 1.8 degrees thus providing 200 steps.

In one-phase energization, the phases A, B, C and D are cyclically energized to provide a force proportional to the current $\vec{A}, \vec{B}, \vec{C}$ or $\vec{D}$. In two-phase energization, two phases A and B, B and C, C and D, or D and A are simultaneously energized during one step of rotation. In the figure, vectors $\vec{AB}, \vec{BC}, \vec{CD}$ and $\vec{DA}$ express the current simultaneously supplied to two phases. Each adjacent pair of vectors $\vec{AB}, \vec{BC}, \vec{CD}$ and $\vec{DA}$ are separated by 90 degrees from each other, that is, the stepping angle will be X in this case also. Two-phase energization can provide a force proportional to the scalar product of the adjacent vectors $\vec{A}$ and $\vec{B}$, $\vec{B}$ and $\vec{C}$, $\vec{C}$ and $\vec{D}$, or $\vec{D}$ and $\vec{A}$, which is greater than the force provided in the one-phase energization. Therefore, two-phase energization is usually used in practice.

In one-two phase energization, the phases A and B, B, B and C, C, C and D, D, D and A, and A are cyclically energized. The stepping angle in this energization is X/2 or 0.9 degrees for a 200 step motor. The phase or phases to be energized in one step of rotation can be determined by the phase data stored in the $ROM_2$ 250 (FIG. 9), the $ROM_3$ 22 (FIG. 10) or the $ROM_4$ 24 (FIG. 11), as described before.

In addition to the determination of the phase or phases to be energized, the current to be supplied to the energized phase or phases can be controlled by the current control data stored in the $ROM_2$ 250, the $ROM_3$ 22 or the $ROM_4$ 24, as described before. In the above-mentioned one-phase energization, two-phase energization, and one-two phase energization, the current control data C determines the constant and maximum current to be supplied to each phase. Therefore, the currents $\vec{A}, \vec{B}, \vec{C}$ and $\vec{D}$ are equal to each other. The current control data is especially important in the fine control of energization in the vicinity of the target position.

In one embodiment of fine control, after the energization of the phases A and B by supplying the current $\vec{AB}$, the current supplied to the phase A is changed to A' which is expressed as: A' = A cos 67.5° = 0.38 A, and the current $\vec{B}$ is maintained as it is. As a result, a current $\vec{A'B}$ which is a scalor product of the vectors $\vec{A'}$ and $\vec{B}$ is supplied to the phases A and B after X/4 degrees of rotation of the rotor. That is, in this embodiment of fine control, the stepping angle is X/4 or 0.45 degrees.

In a similar way, a stepping angle of X/8 degrees or X/16 degrees can be realized by controlling the current supplied to each phase. In the vicinity of the target position, by using the above-mentioned fine control, overshoot of the rotor with respect to the target position can be prevented, as will be seen from FIGS. 14 and 15.

Figure 15:
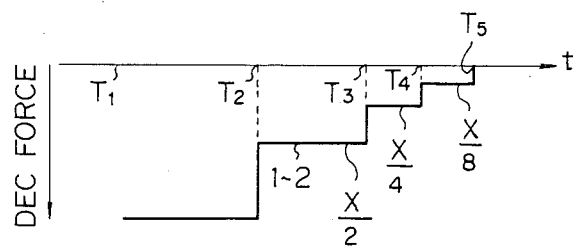
FIG. 15 is a graph of the relationship between acceleration force or deceleration force and time used in explaining fine control near the target position.

FIG. 15 illustrates the deceleration force with respect to time during a deceleration process according to an embodiment of the present invention. In FIG. 15, during a period from a time $T_1$ to a time $T_2$, at which time the designated character reaches a position before the target position by, for example, four characters, the two-phase energization is executed with the maximum current. During the next period from the time $T_2$ to a time $T_3$ at which the designated character reaches a position before the target position by, for example, two characters, the one-two phase energization is executed with the maximum current. During a period from the time $T_3$ to a time $T_4$, at which time the designated character reaches a point before the target position by one character, fine control of the energization is executed with, for example, the current $\vec{A'}$ and the current $\vec{B}$. In this fine control period, the stepping angle is X/4. During the period from the time $T_4$ to a time $T_5$ at which the rotor stops, the stepping angle is X/8. Thus, the deceleration force is gradually decreased so that the rotor stops instantly and accurately at the target position.

As illustrated in the preferred embodiments of FIGS. 3A through 13B, the phase data P and the current control data C can determine the following nine modes 1 through 9 for selecting the next phase:

(1) two-phase energizing with the maximum current $I_{max}$;

(2) one-two phase energizing with the maximum current $I_{max}$;

(3) one phase is not changed and the other phase is energized with a current of $\frac{3}{4} I_{max}$;

(4) one phase is not changed and the other phase is energized with a current of $\frac{1}{2} I_{max}$;

(5) one phase is not changed and the other phase is energized with a current of $\frac{1}{4} I_{max}$;

(6) one phase is energized with a current of $\frac{3}{4} I_{max}$ and the other phase is not changed;

(7) one phase is energized with a current of $\frac{1}{2} I_{max}$ and the other is not changed;

(8) one phase is energized with a current of $\frac{1}{4} I_{max}$ and the other phase is not changed; and (9) both phases are not changed.

The relationship among the contents in the existing phase register 39 (FIG. 12B), the above modes and the currents supplied in the next step appears in Table 1.

TABLE I

| Existing Register | Mode | Next Step |
|---|---|---|
| AB | 1 | $\vec{B} \cdot \vec{C}$ |
| AB | 2 | $\vec{B}$ |
| AB | 3 | $\frac{3}{4} \vec{A} \cdot \vec{B}$ |
| AB | 4 | $\frac{1}{2} \vec{A} \cdot \vec{B}$ |
| AB | 5 | $\frac{1}{4} \vec{A} \cdot \vec{B}$ |
| AB | 6 | $\vec{A} \cdot \frac{3}{4} \vec{B}$ |
| AB | 7 | $\vec{A} \cdot \frac{1}{2} \vec{B}$ |
| AB | 8 | $\vec{A} \cdot \frac{1}{4} \vec{B}$ |
| AB | 9 | $\vec{A} \cdot \vec{B}$ |

The present invention is not restricted to the foregoing embodiments. Various changes and modifications are possible without departing from the spirit of the present invention. For example, in place of the four-phase stepper motor, any stepper motor having any number of phases can be driven by a stepper motor control system according to the present invention. Further, in the change point control between acceleration and deceleration, in place of providing the ON period, or the ON period and the OFF period, various modes of operation can be carried out by appropriately setting the contents of the $ROM_2$ 250 (FIG. 9). Still further, the present invention may be applied to drive not only the print wheel or the space mechanism in a printer, but also to drive any other equipment.

From the foregoing description, it will be apparent that, according to the present invention, an improved stepper motor control system is provided which can step, in a jump control mode, the rotation of a stepper motor accurately and instantly to a desired position, without the need for additional acceleration and deceleration tables, by providing a change point control table for controlling a change point between acceleration and deceleration. In addition, the stepper motor control system according to the present invention has an improved driver circuit which can return the regenerative energy stored in the coils of the stepper motor to a power supply without including an element for consuming the regenerative energy, resulting in little heat generation and low cost. Further, by employing the phase data and the current control data in the deceleration table, fine control can be performed in the vicinity of the target position.

I claim:

1. A stepper motor control system for rotating a stepper motor by a desired amount of angular displacement, comprising:

a stepper motor, having a rotatable member, for rotating the rotatable member at a rotation speed; and control means, operatively connected to said stepper motor, for driving said stepper motor through the desired amount of angular displacement when the desired amount of angular displacement is larger than a predetermined amount by accelerating the rotatable member of said stepper motor by supplying an acceleration pulse sequence to said stepper motor until the rotation speed equals a predetermined rotation speed, driving the rotatable member at substantially the predetermined rotation speed, and sequentially decelerating the rotatable member of said stepper motor from the predetermined rotation speed by supplying a decelerating pulse sequence to said stepper motor to stop after the desired amount of angular displacement, and for driving said stepper motor when the desired amount of angular displacement is smaller than the predetermined amount of angular displacement by accelerating the rotatable member of said stepper motor by supplying the acceleration pulse sequence to said stepper motor until the rotation speed equals an intermediate rotation speed slower than the predetermined rotation speed determined according to the desired amount of angular displacement, regulating the rotation speed when the accelerating is stopped so that said stepper motor is able to follow decelerating control, and decelerating the rotatable member of said stepper motor by supplying a portion of the deceleration pulse sequence to said stepper motor after the regulating.

2. A stepper motor control system as set forth in claim 1, wherein said control means comprises:

first storing means for storing a plurality of first sets of control data, each of the first sets including at least a first number of acceleration steps of said stepper motor, a second number of constant-velocity steps of said stepper motor used when the desired amount of angular displacement is greater than a first predetermined value, a third number of deceleration steps of said stepper motor and change point control data for controlling said stepper motor during a change point period which occurs during the regulating when the desired amount of angular displacement is smaller than the first predetermined value, one of the first sets being selected in dependence upon the desired amount of angular displacement to determine the first, second and third numbers of the acceleration steps, the constant-velocity steps, and the deceleration steps, respectively;

second storing means for storing a plurality of second sets of control data, each of the second sets including at least first time data indicating an acceleration period for one of the acceleration steps;

third storing means for storing a plurality of third sets of control data, each of the third sets including at least second time data indicating a constant-velocity period for one of the constant-velocity steps;

fourth storing means for storing a plurality of fourth sets of control data, each of the fourth sets including at least third time data indicating a deceleration period for one of the deceleration steps; and processor means, operatively connected to said first, second, third and fourth storing means, for controlling said stepper motor in dependence upon a selected one of each of the first, second and fourth sets of control data corresponding to the desired amount of angular displacement, and when the desired amount of angular displacement is greater than the first predetermined value, controlling in dependence upon one of the third sets of control data and in dependence upon the change point control data for controlling said stepper motor during the change point period when the desired amount of angular displacement is smaller than the first predetermined value, and, when the desired amount of angular displacement is greater than the first predetermined value, the rotatable member of said stepper motor is accelerated for the first number of acceleration steps, then rotated at substantially the predetermined rotation speed for the second number of constant-velocity steps, and decelerated by the third number of deceleration steps, and when the desired amount of angular displacement is smaller than the first predetermined value, the rotatable member of said stepper motor is accelerated for the first number of acceleration steps, then controlled by the change point control data, and decelerated for the third number of deceleration steps.

3. A stepper motor control system as set forth in claim 2, wherein said stepper motor has a plurality of phases, and the change point control data includes fourth time data indicating a first predetermined energizing period to energize a first phase after completing the acceleration steps.

4. A stepper motor control system as set forth in claim 3, wherein the first predetermined energizing period is substantially as long as the change point period.

5. A stepper motor control system as set forth in claim 4, wherein the rotatable member of said stepper motor is a rotor, having a position, and the first predetermined energizing period is determined to match the rotation speed and the position of the rotor at the end of the change point period with the rotation speed and the position of the rotor at the beginning of the deceleration period.

6. A stepper motor control system as set forth in claim 4, wherein the first predetermined energizing period is determined to impart acceleration during a part of the first predetermined energizing period to compensate for deceleration energy generated during the remaining part of the first predetermined energizing period.

7. A stepper motor control system as set forth in claim 3, wherein the first predetermined energizing period is determined to impart acceleration during a part of the first predetermined energizing period to compensate for deceleration during the remaining part of the first predetermined energizing period plus friction energy consumed in said stepper motor during the change point period.

8. A stepper motor control system as set forth in claim 3,
wherein each of the second sets further includes acceleration phase data for determining a next phase to be energized after the acceleration period for each of the acceleration steps and acceleration current control data for determining a first amount of electrical current to be supplied to the next phase, and wherein the first phase to be energized during the first predetermined energizing period is determined by the acceleration phase data provided when the acceleration steps are completed, and a second amount of electrical current to be supplied to the first phase is determined by the acceleration current control data provided when the acceleration steps are completed.

9. A stepper motor control system as set forth in claim 8, wherein the first predetermined energizing period is smaller than the change point period, and the change point control data further includes fifth time data indicating a second predetermined energizing period included in the change point period for energizing an absolute phase after the first predetermined period, absolute phase data indicating the absolute phase to be energized after the first predetermined energizing period and absolute current control data indicating a third amount of electrical current to be supplied to the absolute phase.

10. A stepper motor control system as set forth in claim 9, wherein the absolute phase data and the absolute current control data indicate that none of the phases are energized during the second predetermined energizing period.

11. A stepper motor control system as set forth in claim 10, wherein said stepper motor imparts acceleration and deceleration and the second predetermined energizing period is determined to compensate the acceleration with the deceleration imparted by said stepper motor during the change point period.

12. A stepper motor control system as set forth in claim 10, wherein the first predetermined energizing period plus the second predetermined energizing period are substantially as long as the change point period.

13. A stepper motor control system as set forth in claim 12, wherein the rotatable member of said stepper motor is a rotor, having a position, and the first and second predetermined energizing periods are determined to match the rotation speed and the position of the rotor at the end of the change point period with the rotation speed and the position of the rotor at the beginning of the deceleration period.

14. A stepper motor control system as set forth in claim 12, wherein the first predetermined energizing period and the second predetermined energizing period are determined to impart acceleration during a part of the change point period to compensate for deceleration during the remaining part of the change point period.

15. A stepper motor control system as set forth in claim 12, wherein the first predetermined energizing period and the second predetermined energizing period are determined to impart acceleration during a part of the change point period to compensate for deceleration during the remaining part of the change point period plus friction energy consumed in said stepper motor during the change point period.

16. A stepper motor control system as set forth in claim 3, wherein each of the fourth sets further includes deceleration phase data for determining a next phase to be energized after the decleration period for each of the deceleration steps and deceleration current control data for determining an amount of electrical current to be supplied to the next phase, and a fine control of deceleration is effected by decreasing the amount of electrical current supplied when the rotatable member closely approaches the desired amount of angular displacement.

17. A stepper motor control system as set forth in claim 2, wherein said stepper motor drives a serial printer having a print wheel which is coupled to said stepper motor.

18. A stepper motor control system as set forth in claim 2 or 16, wherein said stepper motor drives a serial printer having a space mechanism which is coupled to said stepper motor.

19. A stepper motor control system for a stepper motor connectable to a load to be moved by a desired amount of angular displacement, said system comprising:
   control means, operatively connected to the stepper motor, for controlling the angular displacement of the load including acceleration and deceleration; and
   storage means, operatively connected to said control means, for storing acceleration data, deceleration data and change point data which includes data necessary for a smooth transition from acceleration to deceleration and exact positioning of the load by the desired amount of angular displacement without oscillation of the load.

20. A stepper motor control system as set forth in claim 19, wherein said storage means comprises:
   a first memory, operatively connected to said control means, for storing sets of control data, each set of control data corresponding to a different amount of angular displacement and including a first number of acceleration steps, a second number of deceleration steps and the change point data which includes a first time period, a first phase indicator and a first current amount;
   a second memory, operatively connected to said control means, for storing sets of the acceleration data for acceleration steps, each of the sets of the acceleration data including a second time period, a second phase indicator and a second current amount; and
   a third memory, operatively connected to said control means, for storing sets of the deceleration data for deceleration steps, each of the sets of the deceleration data including a third time period, a third phase indicator and a third current amount.

21. A stepper motor control system as set forth in claim 20, wherein the stepper motor includes coils corresponding to phases and said control means comprises:
   a central processing unit, operatively connected to said first, second and third memories, for reading and outputting the first, second and third time periods and current amounts and calculating a phase to be energized based on a previously energized phase and one of the first, second and third phase indicators; and
   a driver circuit, operatively connected to said central processing unit and the coils in the stepper motor, comprising:
      a phase change buffer, operatively connected to said central processing unit, for storing the phase to be energized and one of the first, second and third current amounts;
      a timer, operatively connected to said central processing unit, for storing and counting one of the first, second and third time periods and generating a write signal when counting is completed;
      an output buffer, operatively connected to said phase change buffer and said timer, for storing the contents of the phase change buffer when the write signal is generated, comprising:
         first output terminals identifying the phase to be energized, each of said first output terminals corresponding to one of the coils of the stepper motor; and
         second output terminals indicating an amount of current in dependence upon one of the first, second and third current amounts; and
         coil driving means, operatively connected to the first and second output terminals and the coils, for driving each of the coils as identified by the first output terminals for the amount of current indicated by the second output terminals.

22. A stepper motor control system as set forth in claim 21, wherein said coil driving means comprises:
   a switch operatively connected to the second output terminals;
   a resistor network, operatively connected to said switch, for generating different voltages in dependence upon the amount of current indicated by the second output terminals;
   comparator means, operatively connected to said resistor network, for comparing the different voltages with a reference voltage;
   AND gates operatively connected to said comparator means and the first output terminals;
   transistors operatively connected to said AND gates and said comparator means;
   first diodes operatively connected to said transistors and the coils of the stepper motor; and
   second diodes operatively connected to the coils of the stepper motor and ground.

23. A method for controlling a stepper motor having a maximum velocity and a load to be moved a desired amount of angular displacement, comprising the steps of:
   (a) accelerating the load of the stepper motor to a velocity slower than the maximum velocity;
   (b) decelerating the load of the stepper motor to a substantially instantaneous stop without oscillation after moving the desired distance; and
   (c) varying the velocity between said accelerating and decelerating steps to achieve a smooth transition between said accelerating and decelerating steps, resulting in the substantially instantaneous stop.

24. A method for controlling a stepper motor having a maximum velocity and a load to be moved a desired amount of angular displacement, the stepper motor having phases and the load being moved by energizing the phases of the stepper motor, said method comprising the steps of:
   (a) accelerating the load of the stepper motor to a velocity slower than the maximum velocity;
   (b) decelerating the load of the stepper motor to a substantially instantaneous stop without oscillation after moving the desired distance; and (c) regulating the velocity between said accelerating and decelerating steps to achieve a smooth transition between said accelerating and decelerating steps, resulting in the substantially instantaneous stop, step (c) comprising the steps of:
  (ci) determining a first phase to be energized;
  (cii) determining a first amount of current to be supplied to the first phase;
  (ciii) determining the first amount of time to energize the first phase; and
  (civ) energizing the first phase by the first amount of current for the first amount of time to produce at least one of acceleration and deceleration of the load of the stepper motor.

25. A method for controlling a stepper motor as set forth in claim 24, wherein step (c) is performed for a change point period of time and the first amount of time is determined in step (cii) so that the accelerating in step (civ) is compensated for by deceleration during the change point period of time.

26. A method for controlling a stepper motor as set forth in claim 25, wherein step (c) further comprises step (cv) determining a second amount of time, included in the change point period of time, during which the first phase is not energized by the first current.

27. A method for controlling a stepper motor as set forth in claim 26, wherein a sum of the first amount of time and the second amount of time substantially equals the change point period of time and none of the phases are energized during the second amount of time.

28. A method for controlling a stepper motor as set forth in claim 26, wherein step (c) further comprises the steps of:
  (cvi) indicating a second phase to be energized when step (b) starts;
  (cvii) indicating a second amount of current to be supplied to the second phase; and
  (cvii) energizing the second phase by the second amount of current for the second amount of time.

29. A method for controlling a stepper motor having a maximum velocity and a load to be moved a desired amount of angular displacement, comprising the steps of:
  (a) accelerating the load of the stepper motor to a velocity slower than the maximum velocity;
  (b) decelerating the load of the stepper motor to a substantially instantaneous stop without oscillation after moving the desired distance, step (b) comprising the steps of:
    (bi) determining a first phase to be energized;
    (bii) determining a first amount of current to be supplied to the first phase;
    (biii) determining a first amount of time to energize the first phase;
    (biv) energizing the first phase by the first amount of current for the first amount of time to decelerate the load of the stepper motor;
    (bv) determining a second phase to be energized, which may be the first phase;
    (bvi) determining a second amount of current, smaller than the first amount of current, to be supplied to the second phase;
    (bvii) determining a second amount of time to energize the second phase;
    (bviii) energizing the second phase by the second amount of current for the second amount of time to decelerate the load of the stepper motor; and
    (bix) repeating steps (bv) through (bviii) as necessary to bring the load of the stepper motor to a stop without oscillation after the desired amount of angular displacement; and
  (c) regulating the velocity between said accelerating and decelerating steps to achieve a smooth transition between said accelerating and decelerating steps, resulting in the substantially instantaneous stop.

* * * * *